(12) United States Patent
Takubo

(10) Patent No.: US 7,596,941 B2
(45) Date of Patent: Oct. 6, 2009

(54) AIR-FUEL RATIO CONTROL DEVICE FOR INTERNAL COMBUSTION ENGINE

(75) Inventor: Hideki Takubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 11/593,580

(22) Filed: Nov. 7, 2006

(65) Prior Publication Data

US 2007/0261391 A1 Nov. 15, 2007

(30) Foreign Application Priority Data

May 12, 2006 (JP) ............... 2006-133810

(51) Int. Cl.
*F01N 3/00* (2006.01)
(52) U.S. Cl. .............. 60/285; 60/276; 60/277; 701/103; 701/109
(58) Field of Classification Search ........... 60/274, 60/276, 277, 285; 701/103, 109, 115
See application file for complete search history.

(56) References Cited

U.S. PATENT DOCUMENTS 5,115,639 A * 5/1992 Gopp .................. 60/274

5,839,415 A * 11/1998 Suzuki et al. ............... 123/491
5,852,930 A * 12/1998 Yasui et al. .................. 60/276
6,067,794 A * 5/2000 Simon et al. ................. 60/285
6,567,738 B2 * 5/2003 Gopp et al. ................. 701/109
7,032,374 B2 * 4/2006 Okazaki et al. .............. 60/285

FOREIGN PATENT DOCUMENTS

| JP | 63-195351 A | 8/1988 |
|---|---|---|
| JP | 06-42387 A | 2/1994 |
| JP | 06-50204 A | 2/1994 |
| JP | 2005-120870 A | 5/2005 |
| JP | 2006-90207 A | 4/2006 |

* cited by examiner

*Primary Examiner*—Binh Q. Tran
(74) *Attorney, Agent, or Firm*—Sughrue Mion, PLLC

(57) ABSTRACT

An air-fuel ratio control device for an internal combustion engine can detect the deteriorated purification state of a catalyst without delay after completion of rich or lean control, and can rapidly restore the purification state. A filter process constant for a downstream $O_2$ sensor output is set smaller when rich or lean control are performed, thus allowing detection of the deteriorated purification state of the catalyst without delay. After the rich or lean control is completed, a dual $O_2$ control system is used to rapidly restore the purification state. Further, the impact of downstream $O_2$ sensor output variation when the catalyst is deteriorated can be suppressed, and stability of the dual $O_2$ control system can be maintained.

13 Claims, 17 Drawing Sheets

1: ENGINE BODY
3: AIR FLOW METER
4: DISTRIBUTOR
5, 6: CRANK ANGLE SENSORS
10: CONTROL CIRCUIT
12: CATALYTIC CONVERTER
13: UPSTREAM $O_2$ SENSOR
15: DOWNSTREAM $O_2$ SENSOR

AIR-FUEL RATIO CONTROL DEVICE FOR INTERNAL COMBUSTION ENGINE

BACKGROUND OF THE INVENTION

1. Field of the Invention

The present invention relates to an air-fuel ratio control device for an internal combustion engine that is provided with air-fuel ratio sensors at upstream and downstream sides of a catalyst. The air-fuel ratio control device performs air-fuel ratio control based on the output of air-fuel ratio sensors at the upstream and downstream side.

2. Description of the Related Art

Normally, a three-way catalyst is provided in an exhaust passage of an internal combustion engine to simultaneously purify HC, CO, and NOx contained within the exhaust gas. With this catalyst, the purification rate of each one of HC, CO and NOx is increased in the vicinity of the stoichiometric air-fuel ratio. Accordingly, normally, an air-fuel ratio sensor is provided at the upstream side of the catalyst and the air-fuel ratio controlled to be in the vicinity of the stoichiometric air-fuel ratio. Here, a structure will be explained in which oxygen concentration sensors are used as air-fuel ratio sensors for detecting the concentration of specific components contained in the exhaust gas. Hereinafter, the term "oxygen concentration sensor" will be referred to as "$O_2$ sensor".

The upstream $O_2$ sensor provided at the upstream side of the catalyst is positioned at a location in the exhaust system that is as close as possible to the combustion chamber, namely, in the merging area of the exhaust manifold that is upstream of the catalyst. However, the upstream $O_2$ sensor is exposed to high exhaust temperatures and poisoned by various kinds of toxic substance, and thus the output characteristics of the $O_2$ sensor vary substantially. In order to compensate for this variation in characteristics, dual $O_2$ sensor systems have already been proposed in which a downstream $O_2$ sensor is provided at the downstream side of the catalyst. In these dual $O_2$ sensor systems, in addition to the upstream $O_2$ sensor being used to perform a first air-fuel ratio feedback control, the downstream $O_2$ sensor is used to perform a second air-fuel ratio feedback control. Examples of such systems are disclosed in JP-A-63-195351 and JP-A-06-42387.

Although the response speed of the downstream $O_2$ sensor is comparatively slow compared to that of the upstream $O_2$ sensor, the downstream $O_2$ sensor has the following advantages. The impact of heat on the downstream $O_2$ sensor is limited since the exhaust temperature is low at the downstream side of the catalytic converter, and poisoning is also low since the catalyst traps the various kinds of toxic substance. Accordingly, variation in the output characteristics of the $O_2$ sensor is small. In addition, at the downstream side of the catalyst, the exhaust gas is mixed more thoroughly and thus the purification state of the catalyst positioned at the upstream side can be detected more stably.

In the dual $O_2$ sensor system, the output of the downstream $O_2$ sensor is controlled to a target value, thus allowing the variation in the output characteristics of the upstream $O_2$ sensor to be compensated for by the downstream $O_2$ sensor. Accordingly, the purification state of the catalyst can be favourably maintained.

The catalyst has oxygen storage capacity in order to compensate for temporary variations in the upstream air-fuel ratio from the stoichiometric air-fuel ratio. When the air-fuel ratio is leaner than the stoichiometric air-fuel ratio, the catalyst absorbs and stores oxygen within the exhaust gas, whereas when the air-fuel ratio is rich, oxygen stored in the catalyst is released. In this manner, the catalyst has an effect like filter processing, and variations in the upstream side air-fuel ratio are filter processed within the catalyst to generate the air-fuel ratio at the catalyst downstream side.

The oxygen storage capacity of the catalyst is determined by the amount of substance with oxygen storage capacity that is included in the catalyst when it is made. Further, the catalyst of the catalytic converter is exposed to high temperature exhaust gas. Thus, in order that functioning of the catalyst does not deteriorate suddenly under the normal expected usage conditions of the vehicle, the catalyst is designed to be heat resistant. However, there may be occasions when the exhaust gas temperature becomes abnormally high during use due to a cause like misfire. In this case, the oxygen storage capacity of the catalyst drops substantially. Moreover, even under normal usage conditions, if the vehicle's mileage reaches tens of thousands of miles, the oxygen storage capacity of the catalyst will gradually reduce due to age deterioration. Thus, during the initial period after manufacture, the filter action of the $O_2$ storage capacity of the catalyst is large, and the output of the downstream $O_2$ sensor is comparatively stable. However, as the catalyst deteriorates, the filter action also reduces, and thus variation in the air-fuel ratio of the upstream side is transmitted to the downstream side causing the stability of the downstream $O_2$ sensor output to worsen.

In the dual $O_2$ sensor system, the output of the downstream $O_2$ sensor is utilized to correct the air-fuel ratio control using the upstream $O_2$ sensor. However, in the case that the stability of the downstream $O_2$ sensor output has worsened due to catalyst deterioration, the stability of the air-fuel ratio control using the upstream $O_2$ sensor is also impaired. To address this difficulty, a structure has been proposed, such as that disclosed in JP-A-06-50204, in which the output of the downstream $O_2$ sensor is filter processed. Following filter processing, the output of the downstream $O_2$ sensor is used to correct the air-fuel ratio control using the upstream $O_2$ sensor. The time constant of the filter processing is set such that variation in the output of the downstream $O_2$ sensor following catalyst deterioration can be compensated for. Accordingly, even following catalyst deterioration, the stability of air-fuel ratio control does not change.

However, there are times when the upstream air-fuel ratio is made lean or rich such as in fuel cut control, rich control at times of high load, or lean control to improve fuel consumption. At such times, the amount of oxygen in the catalyst reaches the upper/lower limit of the oxygen storage capacity and the atmosphere of the catalyst cannot be maintained at the stoichiometric air-fuel ratio, whereby purification capability drops substantially. Thus, after lean control or rich control is completed, the atmosphere of the catalysts needs to be returned to the stoichiometric air-fuel ratio as rapidly as possible in order to restore purification capability. However, in known air-fuel ratio control devices in which the air-fuel ratio control is performed using the filter processed output of the downstream $O_2$ sensor, there is a delay in detecting the purification state of the catalyst, which leads to a delay in restoring purification capability.

SUMMARY OF THE INVENTION

The invention aims to address the above problems, and it is an object thereof to provide an air-fuel ratio control device for an internal combustion engine that can detect a deteriorated purification state of a catalyst without delay, and that can rapidly restore the purification state after rich or lean control is completed. This is achieved by setting a filter process constant for a downstream air-fuel ratio sensor output to be smaller when rich or lean control are performed.

The air-fuel ratio control device for an internal combustion engine according to the invention includes a catalyst, an upstream and a downstream air-fuel ratio sensor, a first air-fuel ratio feedback control unit, a filter processing unit, a second air-fuel ratio feedback control unit, and a filter constant change unit. The catalyst is disposed in an exhaust system of the internal combustion engine and purifies exhaust gas. The upstream and downstream air-fuel ratio sensors are respectively disposed to the upstream side and downstream side of the catalyst, and detect the air-fuel ratio of the exhaust gas. The first air-fuel ratio feedback control unit uses an output value of the upstream air-fuel ratio sensor to adjust the air-fuel ratio supplied to the internal combustion engine. The filter processing unit performs filter processing such that variation in an output value of the downstream air-fuel ratio sensor is suppressed. The second air-fuel ratio feedback control unit adjusts a control constant of the first air-fuel ratio feedback control unit using the filter processed value of the output value of the downstream air-fuel ratio sensor. The filter constant change unit changes a filter constant of the filter processing unit such that the suppression of the filter processing is reduced, and the filter effect is set smaller. The filter constant change unit changes the filter constant when the air-fuel ratio supplied to the internal combustion engine is being controlled to be rich or lean, and not when the air-fuel ratio supplied to the internal combustion engine is being controlled such that the atmosphere of the catalyst is in the vicinity of the stoichiometric air-fuel ratio.

According to the air-fuel ratio control device for an internal combustion engine of the invention, the filter processing constant of the downstream air-fuel ratio sensor output is set smaller, namely, the suppression effect of the filter processing is reduced and the filter effect is set smaller, when rich or lean control are being performed. As a result, the deteriorated purification state of the catalyst can be detected without delay, and after rich or lean control is completed, the purification state of the catalyst can be rapidly restored. Further, the impact of variation in the downstream air-fuel ratio sensor output when the catalyst is deteriorated can be suppressed, and stability of the dual air-fuel ratio control system can be maintained.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 3:
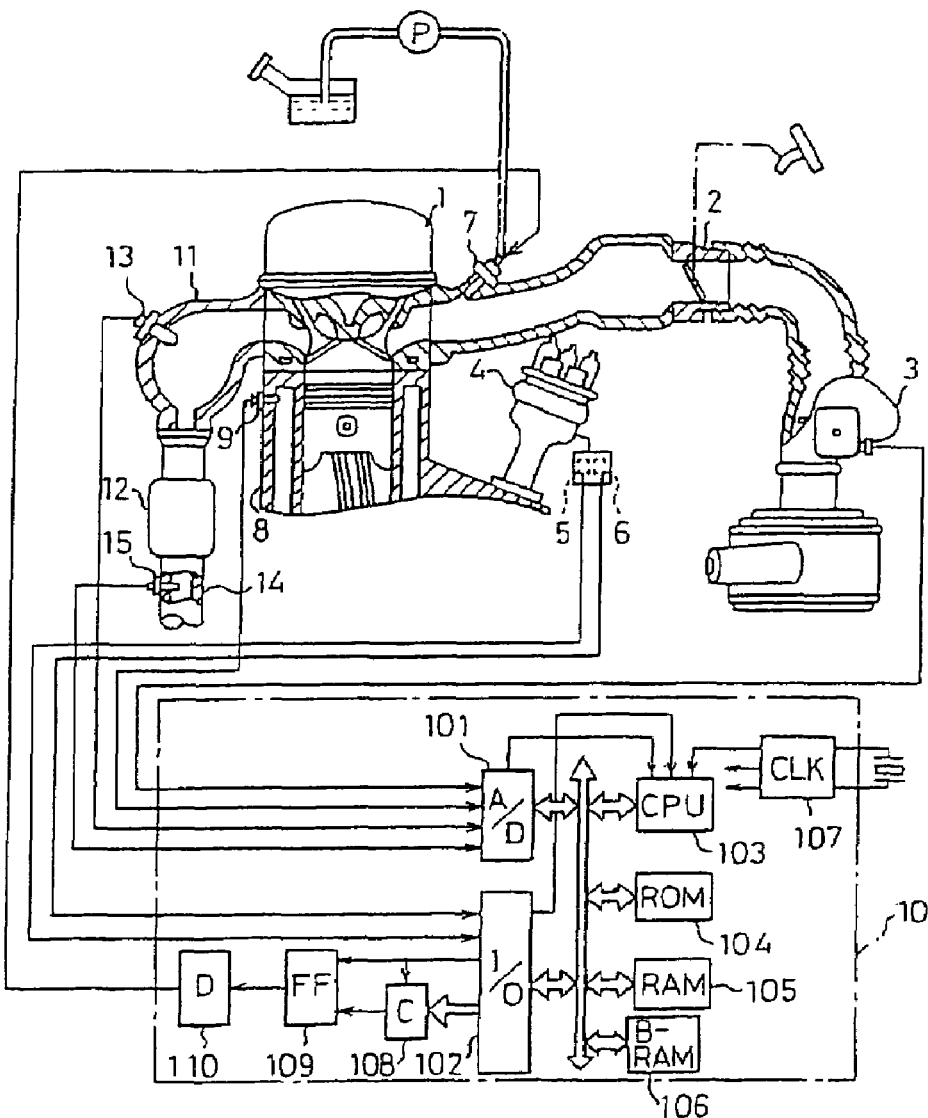
FIG. 3 shows the configuration of the air-fuel ratio control device for an internal combustion engine according to the first embodiment of the invention.

FIG. 3 shows the configuration of an air-fuel ratio control device for an internal combustion engine according to a first embodiment of the invention. In the figure, an air flow meter 3 is disposed in an intake passage 2 of an internal combustion engine body 1. The air flow meter 3 directly measures the intake air quantity, and has a built-in hot-wire and generates an analog voltage output signal that is proportionate to the intake air quantity. The output signal is supplied to an A/D converter 101 with built-in multiplexer, which is included in a control circuit 10. A distributor 4 is provided with a crank angle sensor 5 and a crank angle sensor 6. The crank angle sensor 5 generates a pulse signal indicating detection of a reference position when the shaft of the distributor 4 is at a point corresponding to, for example, each 720 degrees crank angle. The crank angle sensor 6 generates a pulse signal indicating detection of a reference position when the shaft of the distributor 4 is at a point corresponding to each 30 degrees crank angle. The pulse signals of the crank angle sensors 5, 6 are supplied to an input-output interface 102 of the control circuit 10, and the output of the crank angle sensor 6 is also supplied to an interrupt terminal of a CPU 103.

The intake passage 2 is also provided with fuel injection valves 7 for supplying pressurized fuel from the fuel supply system to intake ports of each cylinder. A coolant temperature sensor 9 that detects the temperature of coolant is provided in a water jacket 8 of a cylinder block of the engine body 1. The coolant temperature sensor 9 generates an analog voltage electric signal in accordance with a temperature THW of the coolant. This output is also supplied to the A/D converter 101. A catalytic converter 12 is provided in the exhaust system downstream from an exhaust manifold 11. The catalytic converter 12 houses a three-way catalyst that simultaneously purifies the three hazardous components contained in the exhaust gas, namely, HC, CO and NOx.

A first $O_2$ sensor (upstream air-fuel ratio sensor) 13 is disposed in the exhaust manifold 11, and more specifically is disposed to the upstream side of catalytic converter 12. A second $O_2$ sensor (downstream air-fuel ratio sensor) 15 is disposed in an exhaust passage 14 to the downstream side of the catalytic converter 12. The $O_2$ sensors 13, 15 generate electric signals in accordance with the air-fuel ratio of the exhaust gas. More specifically, the $O_2$ sensors 13, 15 generate different output voltages in accordance with the air-fuel ratio, and these output voltages are supplied to the A/D converter 101 of the control circuit 10. The control circuit 10 is configured from, for example, a micro-computer and includes, in addition to the A/D converter 101, the input-output interface 102, and the CPU 103, a ROM 104, a RAM 105, a backup RAM 106, and a clock generator 107.

When the control circuit 10 calculates a fuel supply quantity $Q_{fuel}$, described hereinafter, driver circuits 108, 109, 110 drive the fuel injection valves 7, and a quantity of fuel that accords with the fuel supply quantity $Q_{fuel}$ is injected into each combustion chamber. Note that, an interrupt of the CPU 103 occurs when, for example: A/D conversion of the A/D converter 101 is completed; the input-output interface 102 receives a pulse signal from the crank angle sensor 6; or an interrupt signal is received from the clock generator 107. Intake air quantity data Q from the air flow meter 3 and coolant temperature data THW are fetched by an A/D conversion routine that is performed at predetermined time intervals. The intake air quantity data Q and the coolant temperature data THW are stored in a predetermined region of the RAM 105, and are updated each predetermined time interval. Further, rotation speed data Ne is calculated by an interrupt that is executed at every 30 degrees (crank-angle) of the crank angle sensor 6. The rotation angle data Ne is stored-in a predetermined region of the RAM 105.

Figure 1:
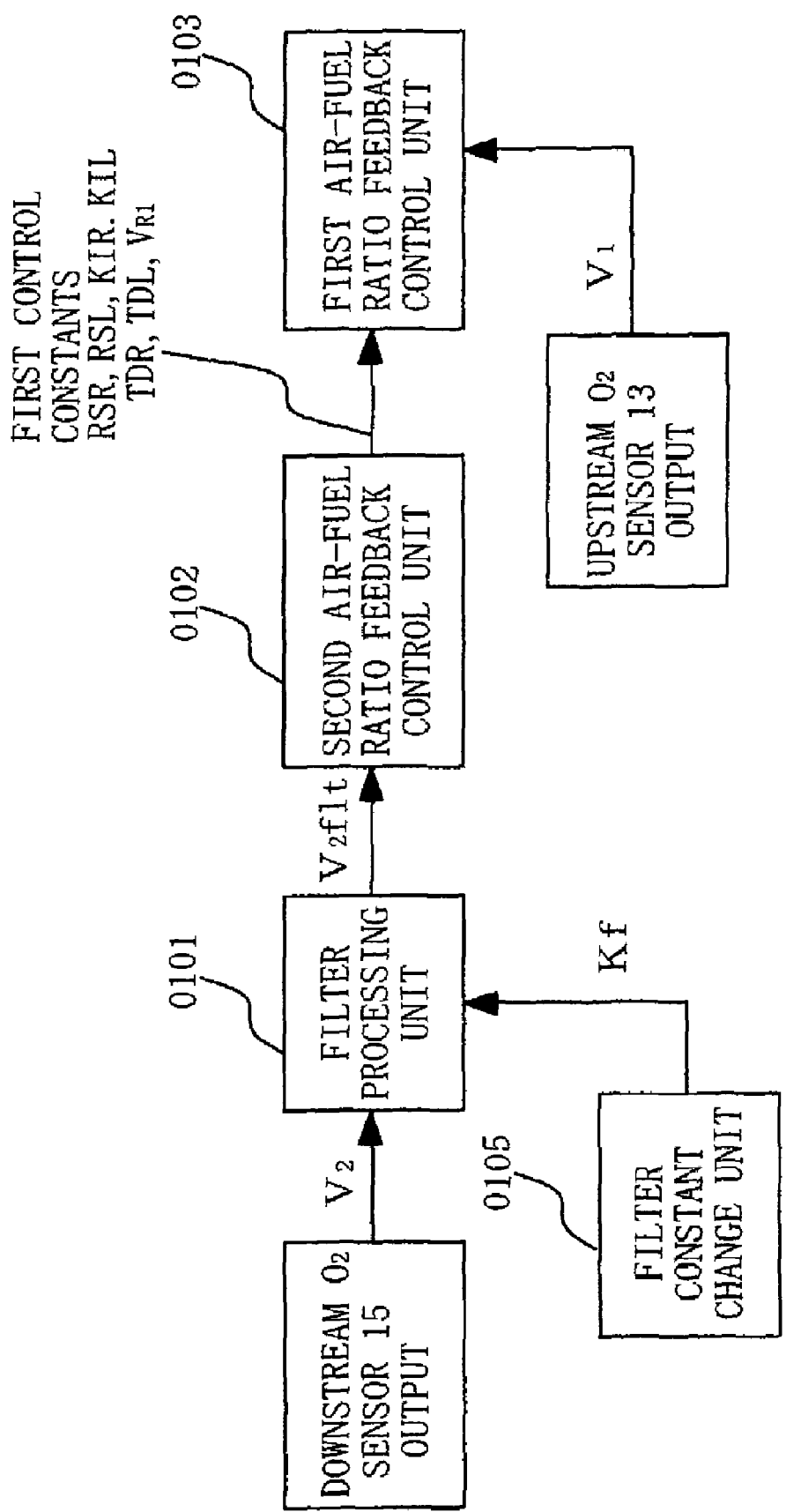
FIG. 1 is a function block diagram showing the basic configuration of an air-fuel ratio control device for an internal combustion engine according to a first embodiment of the invention.
Figure 2:
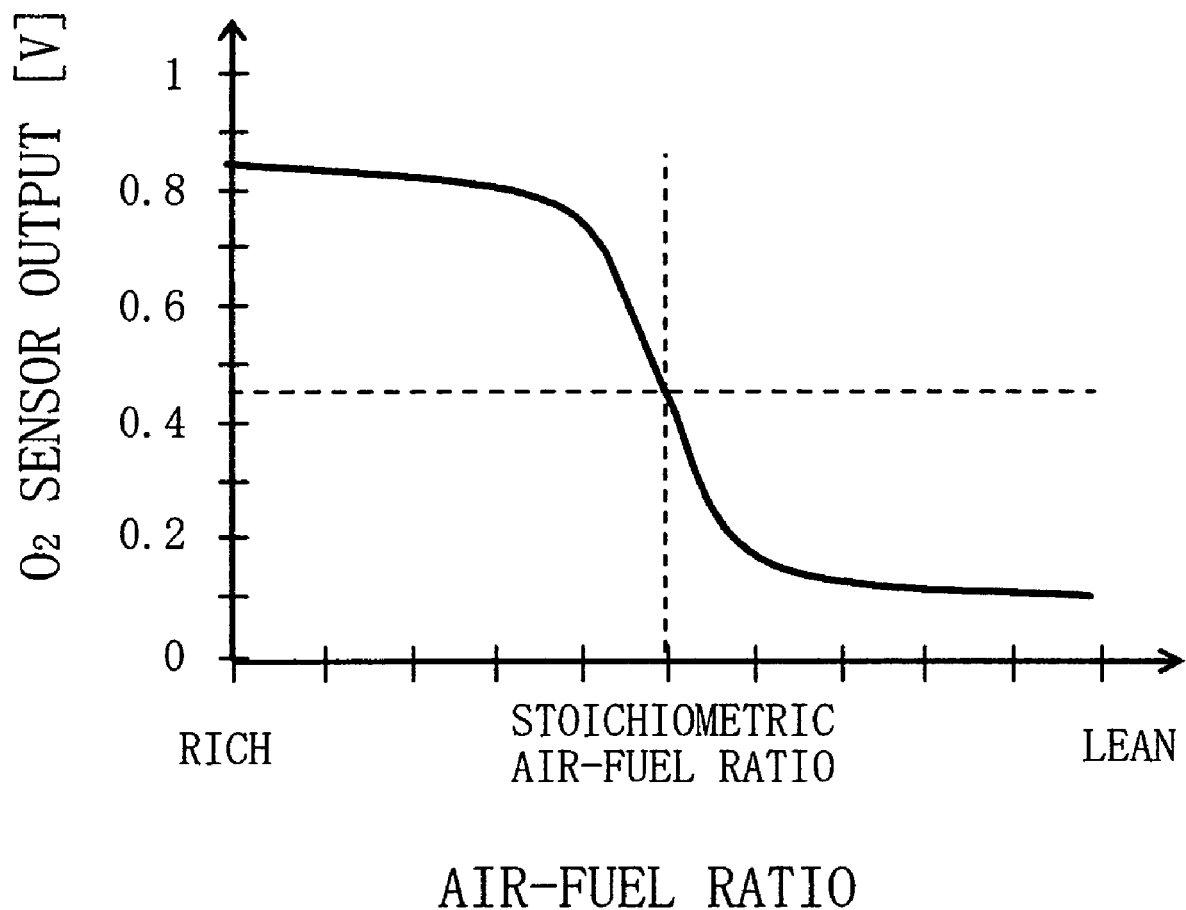
FIG. 2 shows the output characteristics of an air-fuel ratio sensor ($O_2$ sensor)
Figure 4:
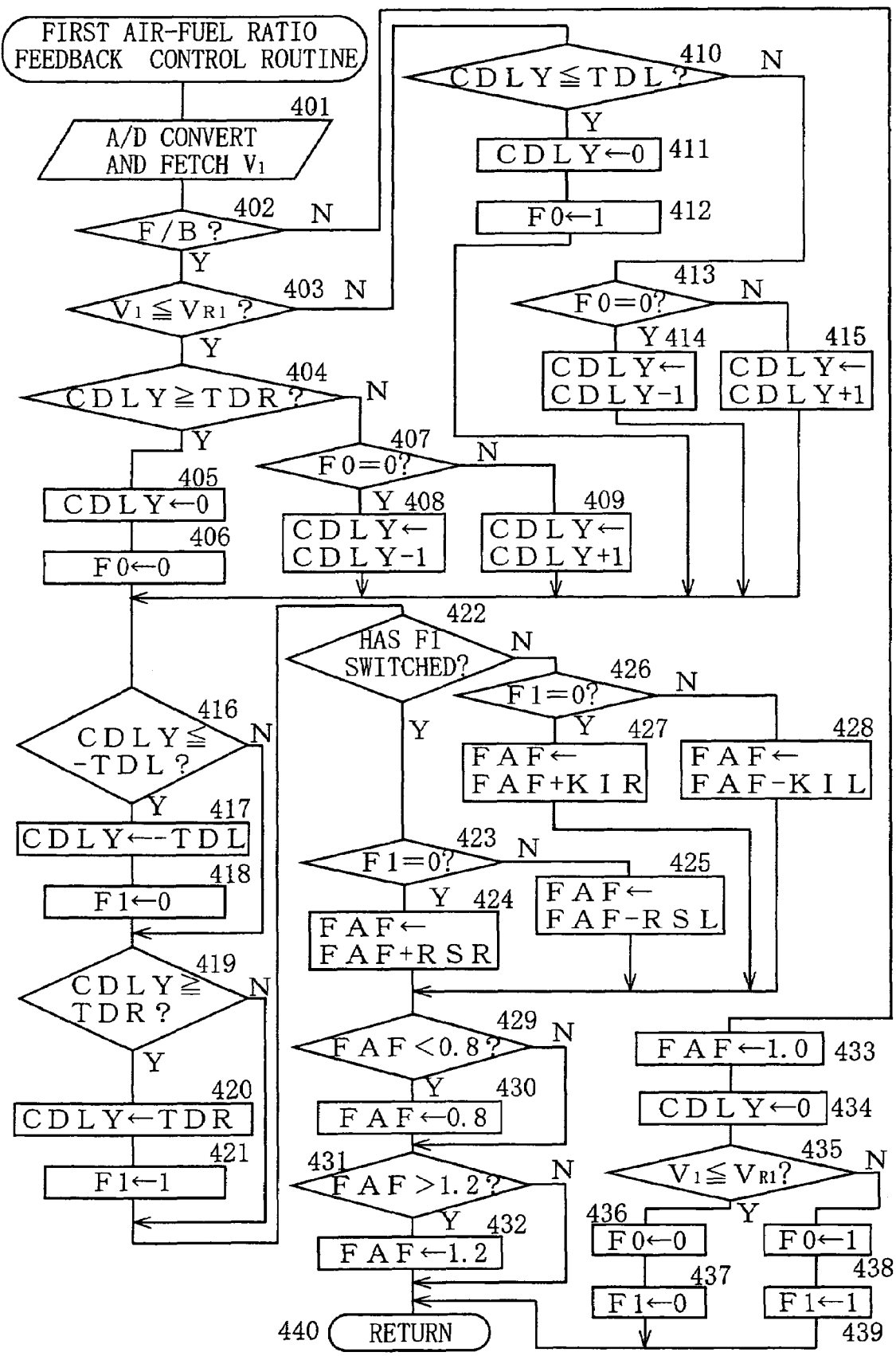
FIG. 4 is a flow chart that explains the operation of a first air-fuel ratio feedback control.

FIG. 4 is a shows a routine of a first air-fuel ratio feedback control unit (corresponding to a first air-fuel ratio feedback control unit 0103 in the routine of FIG. 1) that calculates an air-fuel ratio correction factor FAF based on the output of the upstream $O_2$ sensor 13. The routine is performed at predetermined time intervals, for example, every 5 ms. FIG. 2 is an output characteristic chart for the output of the air-fuel ratio sensor ($O_2$ sensor) showing the air-fuel ratio on the horizontal axis and the $O_2$ sensor output [V] on the vertical axis. Note that, FIG. 1 is a function block diagram showing the basic configuration of the air-fuel ratio control device for an internal combustion engine according to the first embodiment of the invention. In step 401, an output $V_1$ of upstream oxygen $O_2$ sensor 13 is A/D converted and fetched. In step 402, it is determined whether a closed loop (feedback) condition of the air-fuel ratio of the upstream $O_2$ sensor 13 is satisfied. For example, the closed loop condition will not be satisfied in any of the following cases: when there is an air-fuel ratio control state other than a theoretical air-fuel ratio control (e.g., during engine start up, during rich control when coolant temperature is low, during rich control to increase power at high loads, during lean control to improve fuel consumption, during lean control after start up, during fuel cut); when the upstream $O_2$ sensor 13 is not activated; or when the upstream $O_2$ sensor 13 is broken. However, in other cases, the closed loop condition is satisfied.

When the closed loop condition is not satisfied, the routine proceeds to step 433, and the air-fuel ratio correction factor FAF is set to 1.0. Note that, in this case, FAF may be set to the value immediately before termination of the closed loop control or to a learned value (a value in the backup RAM) In step 434, a delay counter CDLY is reset to 0. In step 435, it is determined whether $V_1$ is equal to or less than a reference voltage $V_{R1}$. If the air-fuel ratio is lean ($V_1 \leq V_{R1}$), the routine proceeds to step 436 where a pre-delay air-fuel ratio flag F0 is set to 0 (lean). Then, in step 437, a post-delay air-fuel ratio flag F1 is set to 0 (lean). On the other hand, if the air-fuel ratio is rich ($V_1 > V_{R1}$), the routine proceeds to step 438 where the pre-delay air-fuel ratio flag F0 is set to 1 (rich). Then, in step 439, the post-delay air-fuel ratio flay F1 is set to 1 (rich). In steps 434 to 439, the initial values for when the closed loop condition is not satisfied are set. On the other hand, when the closed loop condition is satisfied, the routine proceeds to step 403.

In step 403, it is determined whether $V_1$ is equal to or less than the reference voltage $V_{R1}$, for example, 0.45 V (refer to FIG. 2). In other words, it is determined whether the air-fuel ratio is rich or lean as compared to the reference voltage $V_{R1}$. If the air-fuel ratio is lean ($V_1 \leq V_{R1}$), the routine proceeds to step 404 where it is determined whether the delay counter CDLY is equal to or more than a maximum value TDR. If CDLY is $\geq$TDR, the delay counter CDLY is set to 0 in step 405. Then, in step 406, the pre-delay air-fuel ratio flag F0 is set to 0 (lean), and the routine proceeds to step 416. In step 404, if CDLY is <TDR, the routine proceeds to step 407 where it is determined whether the pre-delay air-fuel ratio flag F0 is 0 (lean) or not. If F0=0, 1 is subtracted from the delay counter CDLY in step 408. If F0≠0, 1 is added to the delay counter CDLY in step 409, and the routine proceeds to step 416.

On the other hand, if the air-fuel ratio is rich ($V_1 > V_{R1}$) in step 403, the routine proceeds to step 410 where it is determined if the delay counter CDLY is equal to or less than a minimum value −TDL. If CDLY is $\leq$−TDL, the delay counter CDLY is set to 0 in step 411. Then, in step 412, the pre-delay air-fuel ratio flag F0 is set to 1 (rich), and the routine proceeds to step 416. If CDLY >−TDL, it is determined whether the pre-delay air-fuel ratio flag F0 is set to 0 (lean) in step 413. If F0=0, the routine proceeds to step 414 where 1 is subtracted from the delay counter CDLY. If F0 ≠0, the routine proceeds to step 415 where 1 is added to the delay counter CDLY, and then the routine proceeds to step 416.

Steps 416, 417 guard the delay counter CDLY using the minimum value −TDL. If the delay counter CDLY reaches the minimum value −TDL, the post-delay air-fuel ratio flag F1 is set to 0 (lean) in step 418. Note that, the minimum value −TDL is a lean time delay that is defined as a negative value. This lean time delay holds the determination that the air-fuel ratio is rich even if the output of the upstream $O_2$ sensor 13 changes from rich to lean. Steps 419, 420 guard the delay counter CDLY using the maximum value TDR. If the delay counter CDLY reaches the maximum value TDR, the post-delay air-fuel ratio flag F1 is set to 1 (rich) in step 421. Note that, the maximum value TDR is a rich time delay that is defined as a positive value. This rich time delay holds the determination that the air-fuel ratio is lean even if the output of the upstream $O_2$ sensor 13 changes from lean to rich.

In step 422, it is determined whether the sign of the post-delay air-fuel ratio flag F1 has switched, namely, whether the air-fuel ratio has switched since the delay processing. If the air-fuel ratio has switched, the routine proceeds to step 423 where it is determined whether there has been a switch from rich to lean or a switch from lean to rich based on the value of the post-delay air-fuel ratio flag F1. If the switch is from rich to lean, the routine proceeds to step 424 where FAF is skip-increased, namely, FAF←FAF+RSR. On the other hand, if the switch is from lean to rich, the routine proceeds to step 425 where FAF is skip-decreased, namely, FAF←FAF−RSL. In other words a skip process is performed.

If the sign of the post-delay air-fuel ratio flag F1 has not switched in step 426, integral processing is performed in steps 426, 427, 428. In other words, in step 426, it is determined if F1=0, and if F1=0 (lean) the routine proceeds to step 427 where FAF is set to FAF←FAF+KIR. On the other hand, if F1=1 (rich), the routine proceeds to step 428 where FAF is set to FAF←FAF+KIL. Here, the integration constants KIR, KIL are set to be sufficiently small as compared to the skip constants RSR, RSL. In other words, KIR (KIL)<RSR (RSL). Accordingly, in step 427, the fuel injection quantity is gradually increased when the air-fuel ratio is lean (F1=0), and, in step 428, the fuel injection quantity is gradually decreased when the air-fuel ratio is rich (F1=1).

The air-fuel ratio correction factor FAF calculated in steps 424, 425, 427, 428 is guarded by a minimum value, for example, 0.8, in steps 429, 430. Further, in steps 431, 432, the air-fuel ratio correction factor FAF is guarded by a maximum value, for example, 1.2. Accordingly, if the air-fuel ratio correction factor FAF becomes too large or too small for some reason, the air-fuel ratio of the engine is prevented from being controlled to become over-rich or over-lean as a result of these values. The FAF calculated in the above described manner is stored in the RAM 105, and then the routine is terminated in step 440.

Figure 5:
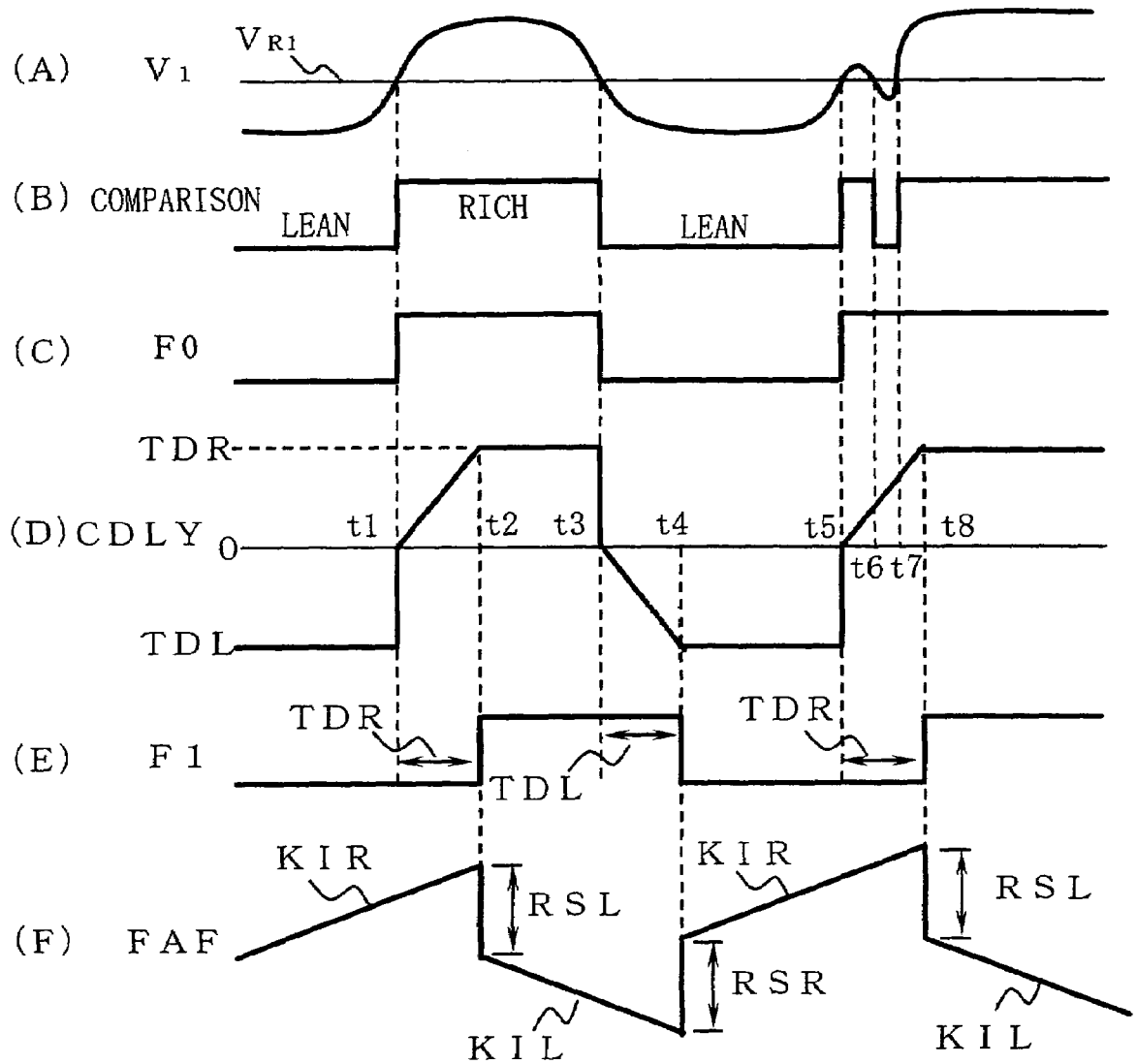
FIG. 5 is a timing chart that provides a supplementary explanation of the operation shown in the flow chart of FIG. 4.

FIG. 5 is a timing chart that provides a supplementary explanation of the operation shown in the flow chart of FIG. 4. The output (A) of the upstream $O_2$ sensor 13 is used as a basis for obtaining a comparison result signal indicating the result of the rich/lean determination, as shown in FIG. 5(B) When the comparison result signal of (B) is obtained, the pre-delay processing air-fuel ratio signal (corresponding to flag F0) changes to rich or lean, as shown in FIG. 5(C). The delay counter CDLY, as shown in FIG. 5(D), increases when the pre-delay processing air-fuel ratio signal F0 is rich, and decreases when the pre-delay processing air-fuel ratio signal F0 is lean. As a result, as shown in FIG. 5(E), the delay processed air-fuel ratio signal (corresponding to flag F1) is established. For example, even if the comparison result signal switches from lean to rich at time t1, the delay processed air-fuel ratio signal F1 is held as lean until the rich time delay TDR has elapsed. Then, at time t2, the air-fuel ratio signal F1 switches to rich. At time t3, even if the air-fuel ratio signal A/F switches from rich to lean, the post-delay processing air-fuel ratio signal F1 is held as rich until a time corresponding to the lean time delay (TDL) has elapsed. Then, at time t4, the air-fuel ratio signal F1 switches to lean.

However, after the rich delay processing has started, even if the comparison result signal switches in a shorter time than the rich time delay TDR as shown by times t5, t6, t7, during the delay processing (from time t5 to t8) until when the delay counter CDLY reaches the rich time delay TDR, the pre-delay processing air-fuel ratio signal F0 does not switch. In other words, the pre-delay processing air-fuel ratio signal F0 is more stable than the comparison result since it is not affected by transient variations in the comparison result. In this manner, the air-fuel ratio correction factor FAF shown in FIG. 5(F) is obtained based on the post-delay processing air-fuel ratio signal F1 and pre-delay processing air-fuel ratio signal F0 that are stabilized by delay processing.

The fuel supply quantity $Q_{fuel}$ supplied to the engine 1 is adjusted in accordance with the fuel correction factor FAF based on the following equation, whereby the air-fuel ratio of the engine 1 is controlled.

$Q_{fuel}1=Q_{fuel}0 \times FAF$ where, $Q_{fuel}0$ is the basic fuel quantity calculated based on the following equation:

$Q_{fuel}0=Q_{acyl}/$target air-fuel ratio where, $Q_{acyl}$ is the fuel quantity supplied to the engine 1 calculated based on an intake air quantity qa detected by the air flow meter 3.

Figure 6:
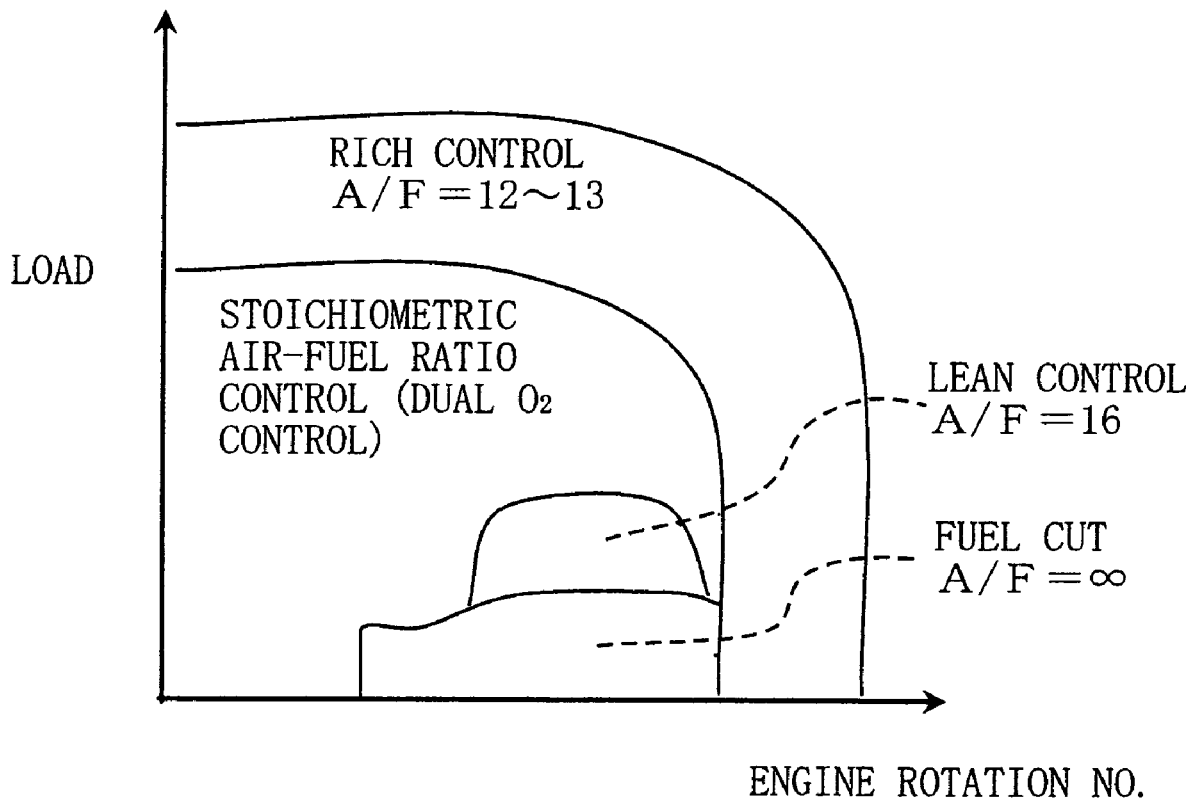
FIG. 6 is a characteristic chart that explains a target air-fuel ratio that changes in accordance with running conditions.

The target air-fuel ratio is set to an air-fuel ratio that is established using a 2 dimensional map shown in FIG. 6, in which the engine rotation number is shown on the horizontal axis and the load is shown on the vertical axis.

Performance of the stoichiometric air-fuel ratio control is the condition for using the second air-fuel ratio feedback control unit. Accordingly, the target air-fuel ratio may be set to an upstream target average air-fuel ratio calculated by the second air-fuel ratio feedback control and controlled in a feed forward manner. By adopting this configuration, the tracking delay of the feedback can be improved when the target value changes, and the fuel correction factor FAF can be maintained in the vicinity around 1.0. Moreover, the fuel correction factor FAF is used as a basis for performing learning control that can compensate for ageing and production variations of the structural elements used in the first air-fuel ratio feedback control. Accordingly, to the extent that the fuel correction factor obtained using the feed forward correction is stable, the accuracy of the learning control is improved. Moreover, the intake air quantity qa may be calculated in accordance with the output of a pressure sensor disposed downstream of a throttle valve in the intake passage 2 and the engine rotation speed, or the throttle valve opening degree and the engine rotation speed.

Figure 7:
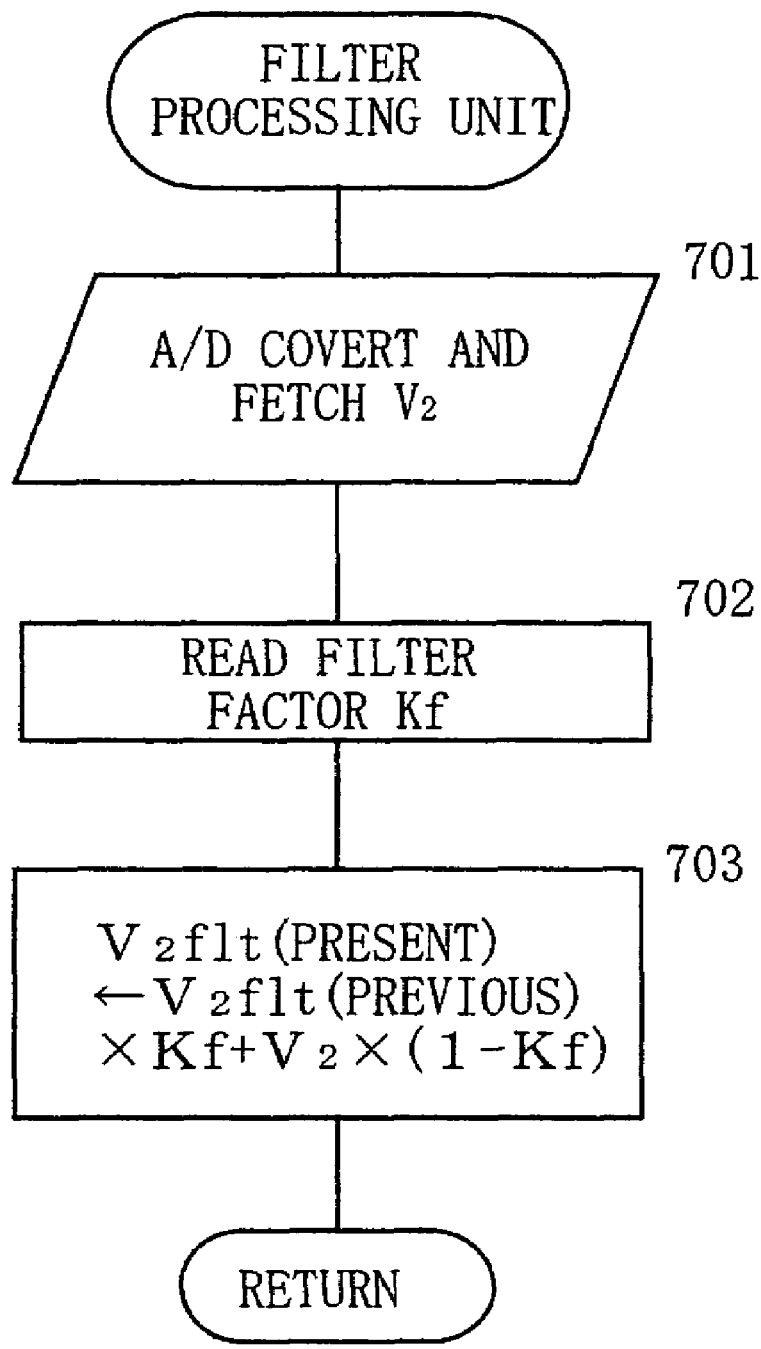
FIG. 7 is a flow chart that explains the operation of a filter processing unit.

FIG. 7 is a flow chart showing the operation of a filter processing unit 0101 (refer to FIG. 1) of an output $V_2$ of the second air-fuel ratio sensor 15, described above. The calculation is performed at predetermined time intervals, for example, every 50 ms. In step 701, the output $V_2$ of the downstream $O_2$ sensor 15 is A/D converted and fetched. The downstream $O_2$ sensor 15 is, as shown in FIG. 2, an λ-sensor having an output voltage that changes rapidly to two different values when the air-fuel ratio of the sensor atmosphere changes near to the stoichiometric air-fuel ratio. Because the downstream $O_2$ sensor 15 is capable of detecting and analyzing the air-fuel ratio in the vicinity of the stoichiometric air-fuel ratio extremely well, control accuracy is improved.

Next, the routine proceeds to step 702, where a filter factor Kf, corresponding to a time constant, is read. The filter factor Kf is set by a filter constant change unit 0105, described later. Next, the routine proceeds to step 703, where a post-filtering downstream $O_2$ sensor output $V_2$flt is derived using a discrete first order lag filter calculation, like that of the following equation.

$V_2flt(present) \leftarrow V_2flt(previous) \times Kf + V_2(present) \times (1-Kf)$ where, the relationship of time constant T and filter factor Kf is expressed using a discrete transformation by the following equation.

$Kf=\exp(-\Delta T/T)$ where, ΔT is a flow chart processing interval ΔT (in this case, 50 ms).

The above processing completes the filter processing calculation of the output $V_2$ of the second air-fuel ratio sensor 15.

Figure 8:
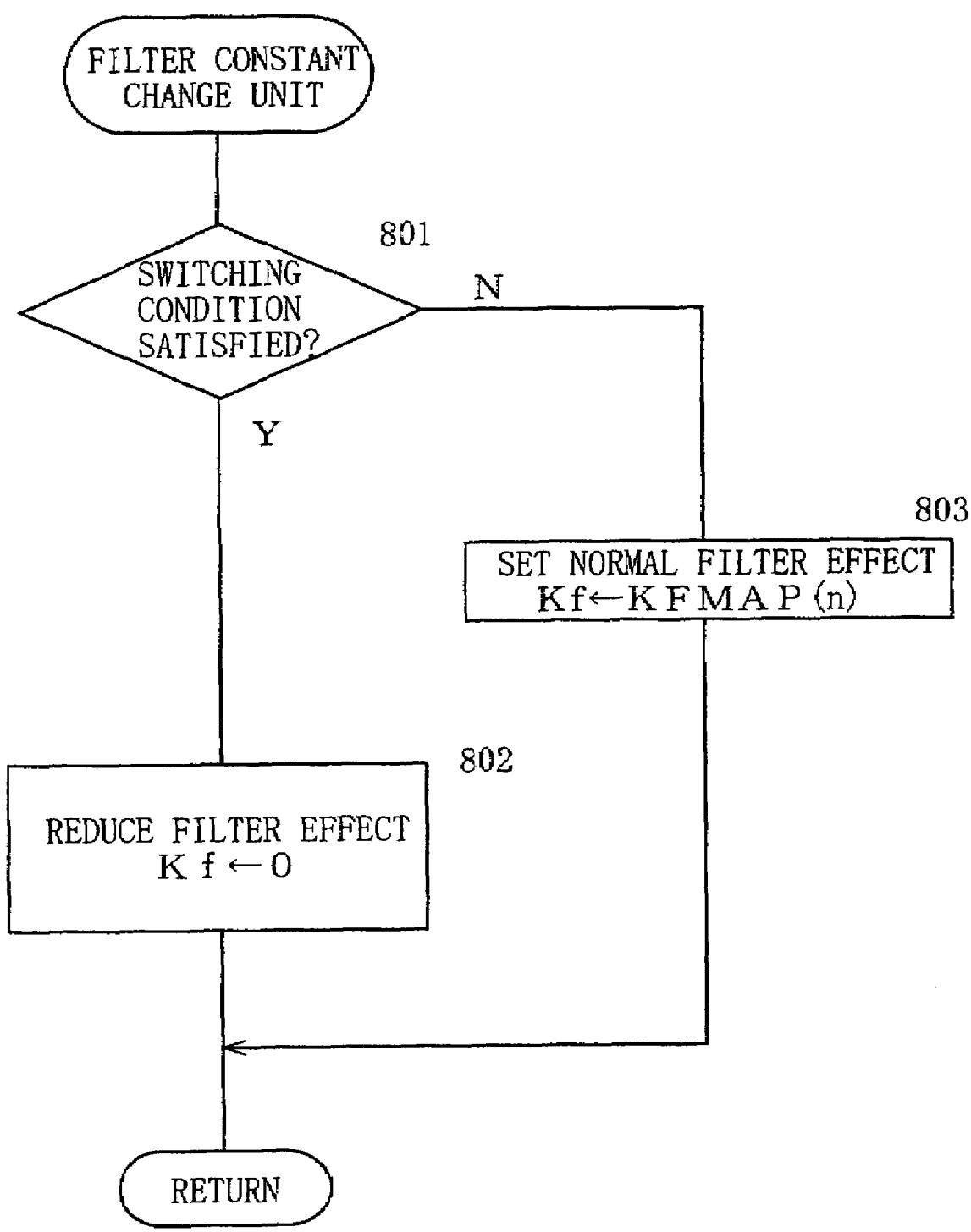
FIG. 8 is a flow chart that explains the operation of a filter constant change unit.

FIG. 8 is a flow chart showing the operation of the filter constant change unit 0105, described above. The calculation is performed at predetermined time intervals, for example, every 50 ms. In step 801, it is determined whether a switching condition for the filter constant is satisfied. When the switching condition is satisfied, rich or lean air-fuel ratio control is being performed that does not aim to control the atmosphere of the catalyst to be in the vicinity of the stoichiometric air-fuel ratio. The lean control includes controls like fuel cut control, lean control to improve fuel consumption, and lean control during engine start up. In the lean control, the air-fuel ratio is controlled to be leaner than the stoichiometric air-fuel ratio. The rich control includes controls like rich control at times of high load and rich control when the coolant temperature is low. In the rich control, the air-fuel ratio is controlled to be richer than the stoichiometric air-fuel ratio. Here, the terms lean control and rich control do not include a process in which the downstream $O_2$ sensor output in the dual $O_2$ control is used to manipulate the upstream air-fuel ratio toward rich or lean around the stoichiometric air-fuel ratio. This is because the dual $O_2$ sensor control is intended to maintain the purification state of the catalyst in the vicinity of the stoichiometric air-fuel ratio.

If it is determined in step 801 that lean control or rich control are being performed, the routine proceeds to step 802, where the filter factor Kf that is the filter constant is set to a smaller value (a smaller time constant), for example, 0 (a time constant 0). In other words, suppression of the filter processing is reduced, whereby the filter effect is set smaller. Alternatively, the switching condition (i.e., used to determine whether it is satisfied) maybe set as a predetermined period during the lean or rich air-fuel ratio control or a predetermined period following the lean or rich air-fuel ratio control. For a short period following the lean or rich control, the purification state of the catalyst is not adequately recover to a target state due to delay of the control object causing a transient state. Accordingly, if the filter constant (the filter factor Kf) is set smaller during this short period following the lean or rich control, the recovery speed can be increased since the purification state of the catalyst is detected without delay. Further, the predetermined period may be set as the period until the downstream $O_2$ sensor output reaches a predetermined voltage in the vicinity of a target value $V_{R2}$. This is because when the downstream $O_2$ sensor output reaches the vicinity of the target value, the state of the catalyst has substantially recovered from the impact of transient operation. Alternatively, the predetermined period may be set as the period up to elapse of a predetermined period after the downstream $O_2$ sensor output reaches the predetermined voltage in the vicinity of the target value $V_{R2}$. This is because when the state of the catalyst recovers from the impact of the transient operation, the downstream $O_2$ sensor output sometimes overshoots and then converges on the target value $V_{R2}$. Moreover, the predetermined period may be set as the period until when an integrated air quantity after the lean or rich control reaches a predetermined value. This is because the speed of recovery of the state of the catalyst from the impact of the transient operation is proportional to the intake air quantity due to the $O_2$ storage action of the catalyst. Further, there is a delay in the exhaust gas moving from the upstream and the downstream of the catalyst to the downstream $O_2$ sensor, and thus the impact of the lean control or the rich control is detected by the downstream $O_2$ sensor with a slight delay. Thus, the predetermined period may be set while taking this delay period into account.

Moreover, the switching condition may be set as being when the first air-fuel ratio feedback control unit 0103 or the second air-fuel ratio feedback control unit 0102 is stopped. This is because, if the first or the second air-fuel ratio feedback control unit is stopped, the purification state of the catalyst cannot be accurately maintained at the stoichiometric air-fuel ratio, and thus the state will be either lean or rich. Further, for the same reason as given for the predetermined period after the lean control or the rich air-fuel ratio control, a post-start predetermined period after the first or the second air-fuel ratio feedback control unit has started (namely, a predetermined period after release of the stopped period of the first or second air-fuel ratio feedback control unit) may be set as the switching condition (i.e., used to determine whether it is satisfied). Further, the post-start predetermined period may be set as: the period until when the downstream $O_2$ sensor output reaches the predetermined voltage in the vicinity of the target value $V_{R2}$; or the period up to elapse of a predetermined period after the downstream $O_2$ sensor output reaches a predetermined voltage in the vicinity of the target value $V_{R2}$. Moreover, the post-start predetermined period may be set as the period until the integrated air quantity after start reaches a predetermined value.

Figure 9:
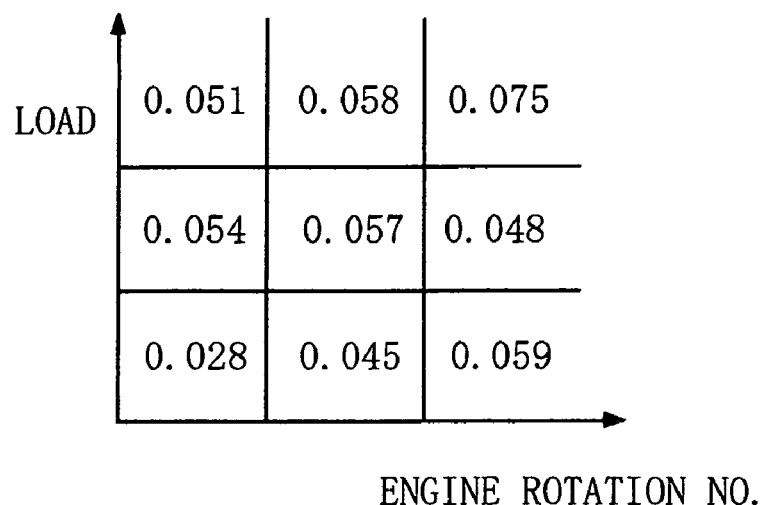
FIG. 9 is a characteristic chart that explains a filter factor that is a filter constant that changes in accordance with running conditions at normal times.

If the filter gain switching condition is not satisfied in step 801, the routine proceeds to step 803. In step 803, the filter factor Kf that is one of filter constants is set using the map table KFMAP (a normal filter constant setting map) shown in FIG. 9, that includes pre-set values for every separate zones divided in accordance with the running condition (in this case, the engine rotation no. and load). The value of the zone corresponding to the present running conditions is read and set as the filter factor Kf.

Figure 10:
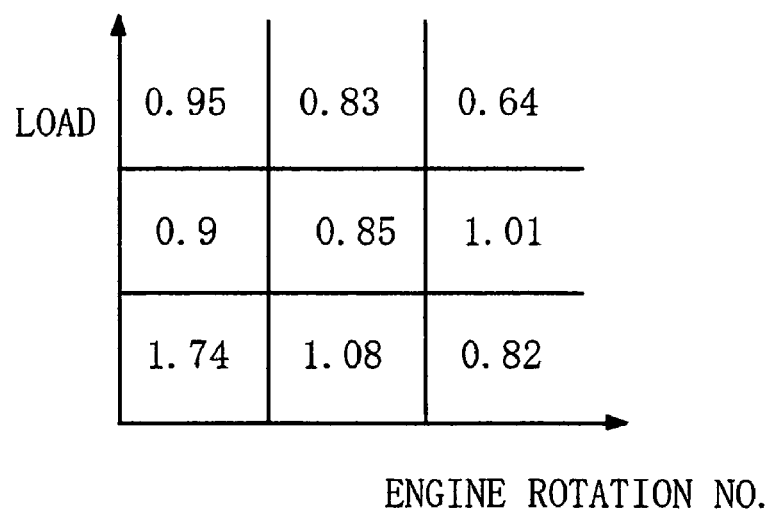
FIG. 10 is a characteristic chart that explains a filter time constant that is a filter constant that changes in accordance with running conditions at normal times.

The filter time constant that is one of filter constants is set to a value that can compensate for variation in the output of the second air-fuel ratio sensor in the case that the catalyst deteriorates and variation in the air-fuel ratio of the first air-fuel ratio feedback control is transmitted to the downstream side of the catalyst. Accordingly, setting is based on the feedback cycle of the first air-fuel ratio feedback control. However, since the feedback cycle changes depending of the running conditions, a bench test was used to establish normal filter time constants [sec] that accord with the running conditions as shown in FIG. 10. These normal filter time constants are converted to the filter constants (filter factors) shown in FIG. 9, and stored in the ROM 104 of the microcomputer. The filter time constant change processing calculation is completed with the above processing.

Next, the second air-fuel ratio feedback control unit 0102 of the downstream $O_2$ sensor 15 will be described. JP-A-63-195351 discloses a system in which the second air-fuel ratio feedback control unit 0102 is used to variably change the skip amounts RSR, RSL, the integration constants KIR, KIL, and the time delays TDR, TDL that are control constants of the first air-fuel ratio feedback control unit 0103, and the reference voltage $V_{R1}$ of the output voltage $V_1$ of the upstream $O_2$ sensor 13 in accordance with the output of the downstream $O_2$ sensor 15.

For example, if the rich skip amount RSR is made larger, the average air-fuel ratio can be made richer, or if the lean skip amount RSL is made smaller, the average air-fuel ratio can be made richer. Alternatively, if the lean skip amount RSL is made larger, the average air-fuel ratio can be made leaner, or even if the rich skip amount RSR is made smaller, the average air-fuel ratio can be made leaner. Accordingly, the average air-fuel ratio can be controlled by correcting the rich skip amount RSR and the lean skip amount RSL in accordance with the output of the downstream $O_2$ sensor 15.

In addition, if the rich integration constant KIR is made larger, the average air-fuel ratio can be made richer, or even if the lean integration constant KIL is made smaller, the average air-fuel ratio can be made richer. Alternatively, if the lean integration constant KIL is made larger, the average air-fuel ratio can be made leaner, or even if the rich integration constant KIR is made smaller, the average air-fuel ratio can be made leaner. Thus, the average air-fuel ratio can be controlled by correcting the rich integration constant KIR and the lean integration constant KIL in accordance with the output of the downstream $O_2$ sensor 15.

If the rich time delay TDR is set to be larger than the lean delay time (−TDL), the average air-fuel ratio can be made richer. On the other hand, if the lean time delay (−TDL) is set to be larger than the rich time delay (TDR), then the average air-fuel ratio can be made leaner. Thus, the air-fuel ratio can be controlled by correcting the time delays TDR, TDL in accordance with the output of the downstream $O_2$ sensor 15. Further, if the reference voltage $V_{R1}$ is made larger, the average air-fuel ratio can be made richer, and if the reference voltage $V_{R1}$ is made smaller, the average air-fuel ratio can be made leaner. Thus, the air-fuel ratio can be controlled by correcting the reference voltage $V_{R1}$ in accordance with the output of the downstream $O_2$ sensor 15. In this manner, the average air-fuel ratio at the upstream side can be controlled by correcting the above described control constants (referred to as "first control constant") in accordance with the downstream $O_2$ sensor output. Further, controllability of the average air-fuel ratio can be improved by simultaneously manipulating two or more of the time delays, the skip amounts, the integral gains, and the reference voltage that are the first control constant.

In addition, in order to eliminate errors resulting from manipulation of two or more first control constants as the inventors propose, and in order to positively utilize flexibility, the manipulation of the first control constant may be managed using the average air-fuel ratio. More specifically, a converter may be provided in the second air-fuel ratio feedback control. With this configuration, a target average air-fuel ratio may be calculated using the second air-fuel ratio feedback control using the output of the downstream $O_2$ sensor 15, and then the manipulation amount of the first control constant may be calculated from the target average air-fuel ratio. If two or more first control constants are manipulated, the manipulation direction of the average air-fuel ratio, namely, rich or lean, can be managed by nonlinear interaction. However, management of the manipulation amount is problematic, and thus the behavior of the second air-fuel ratio feedback control may become unstable. However, this difficulty can be eliminated by setting the first control constant in accordance with a management index for the target average air-fuel ratio.

Further, the respective first control constants have different advantages and disadvantages from the point of view of controlling the average air-fuel ratio (for example, accuracy of controlling the average air-fuel ratio and manipulation range, or control cycle and air-fuel ratio amplitude etc.). However, if the respective first control constants are precisely set in accordance with the operation point of the target average air-fuel ratio, it is possible to make the most of all of these advantages. In this embodiment, a dual $O_2$ sensor system will be described that is provided with a converter and in which the target average air-fuel ratio is calculated in accordance with the downstream $O_2$ sensor output, and the first control constants are calculated from the target average air-fuel ratio.

Figure 11:
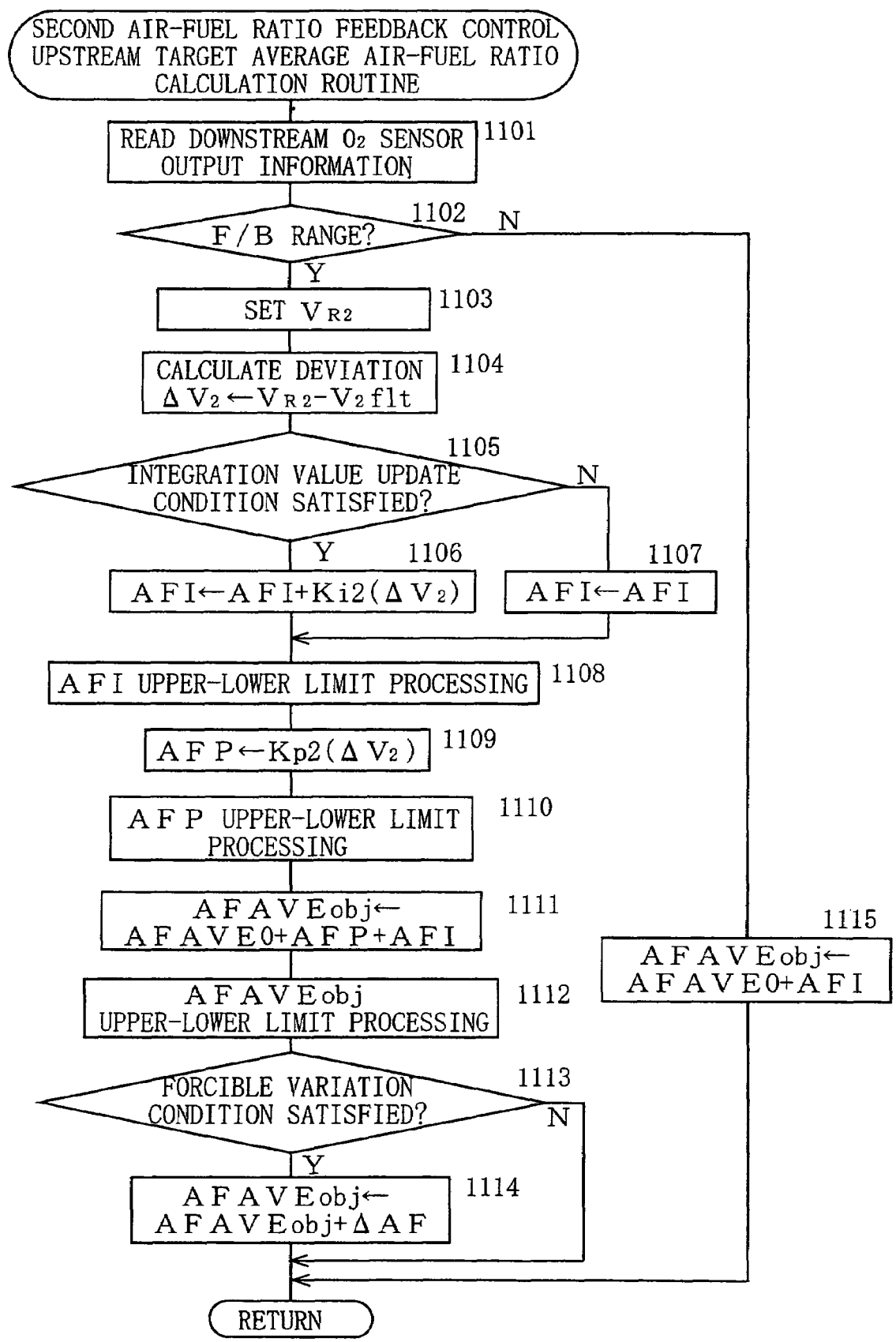
FIG. 11 is a flow chart that explains calculation of an upstream average target air-fuel ratio of a second air-fuel ratio feedback control unit.

FIG. 11 shows an upstream target average air-fuel ratio calculation routine that calculates an average target air-fuel ratio upstream from the catalyst based on the output of the downstream $O_2$ sensor 15 in the second air-fuel ratio feedback control unit 0102. The routine is performed at predetermined time intervals, for example, every 5 ms. First, in step 1101, the output information of the downstream $O_2$ sensor 15 is read. In this case, the post-filter processing downstream $O_2$ sensor output $V_2$flt is used. Then, in step 1102, it is determined whether the closed loop condition of the downstream $O_2$ sensor 15 is satisfied.

For example, the closed loop condition will not be satisfied in any of the following cases: when there is an air-fuel ratio control state other than the theoretical air-fuel ratio control (e.g., during engine start up, during rich control when the coolant temperature is low, during rich control to increase power at high loads, during lean control to improve fuel consumption, during lean control after start up, during fuel cut); when the downstream $O_2$ sensor 15 is not activated; or when the downstream $O_2$ sensor 15 is broken. However, in other cases, the closed loop condition is satisfied. Note that, the determination as to whether the $O_2$ sensor is activated or not activated is based on if a predetermined time has elapsed since start up, or whether the output level of the $O_2$ sensor has once crossed a predetermined voltage.

If the closed loop condition is not satisfied, in step 1115, an average target air-fuel ratio AFAVEobj is set to an initial value AFAVE0+integral value AFI, and the second air-fuel ratio feedback calculation processing is completed. For example, AFAVE0=14.53, and the integral value AFI, which is the value immediately before completion of the closed loop control, is stored in the backup RAM. The initial value AFVAE0 and the integral value AFI are stored for each running zone divided in accordance with each running condition, for example, the rotation number, the load, and the coolant temperature. These set values are the backup RAM values.

If the closed loop condition is satisfied, in step 1103, a second target value $V_{R2}$ is set that functions as the target value of the output $V_2$ of the downstream $O_2$ sensor 15. The target value $V_{R2}$ is set to the predetermined output value of the downstream $O_2$ sensor 15, for example, in the vicinity of 0.45 V, that corresponds with the purification range of the catalyst in the vicinity of the stoichiometric air-fuel ratio. This target value $V_{R2}$ may be set to a higher voltage at which the NOx purification rate of the catalyst is raised, for example, in the vicinity of 0.75 V, or to a lower voltage at which the CO, HC purification rate is raised, for example, in the vicinity of 0.2V. Further, the voltage may be changed in accordance with the running conditions, etc. If the target value $V_{R2}$ is changed in accordance with the running conditions, smoothing processing, for example, filter processing with a first order lag, may also be performed to smooth variations in the air-fuel ratio caused by step-like variations at the time of changing the target value $V_{R2}$.

In step 1104, a deviation $\Delta V_2$ between the second target value $V_{R2}$ and the output $V_2$flt of the downstream $O_2$ sensor 15 after filtering is calculated as:

$$\Delta V_2 = V_{R2} - V_2 flt$$

In steps 1105 to 1111, Proportional-Integral control processing is performed in which a proportional calculation (hereinafter referred to as "P") and an integral calculation (hereinafter referred to as "I") are performed in accordance with the deviation $\Delta V_2$. An output is set that eliminates the deviation. For example, when the downstream $O_2$ sensor output $V_2$ is smaller than the second target value $V_{R2}$ (lean), the upstream target average air-fuel ratio AFAVEobj is set to be rich, thereby causing return to the second target value.

The target average air-fuel ratio of the upstream side of the catalyst, AFAVEobj, is calculated using a normal PI controller.

$$AFAVEobj = AFAVE0 + \Sigma\{Ki2(\Delta V_2)\} + Kp2(\Delta V_2)$$

where, Ki2 is an integral gain, and Kp2 is a proportional gain. AFAVE0 is the initial value described previously, and is a value that corresponds to the stoichiometric air-fuel ratio set for each running condition. AFAVE0 is set, for example, at 14.53. The integral calculation is a comparatively slow operation for generating an output by integrating the deviation, and also has the effect of eliminating any steady deviation of the downstream $O_2$ sensor output caused by characteristic variation of the upstream $O_2$ sensor 13.

Further, as the integral gain Ki2 is set larger, the absolute value of the manipulation amount $\Sigma\{Ki2(\Delta V_2)\}$ increases and thus the control effect is increased. However, if it becomes too large, phase delay becomes large, whereby the control system becomes unstable and hunting occurs. Accordingly, it is essential to set gain appropriately. Moreover, the proportional calculation is highly responsive and generates an output that is proportional to the deviation. Thus, the proportional calculation has the effect of rapidly recovering the deviation. As the proportional gain Kp2 is set larger, the absolute value of the manipulation amount $KP_2 \times \Delta V_2$ becomes larger and the return speed is quicker. However, if it becomes too large, the control system becomes unstable and hunting occurs. Accordingly, it is essential to set gain appropriately.

Thus, in step 1105, it is determined whether an update condition of the integral value is satisfied. When the update condition is satisfied, it is not a time of transient running or a time within a predetermined period after transient running. At times of transient running, the upstream air-fuel ratio is highly unstable, and the downstream air-fuel ratio is also unstable. If integral calculation is performed in such conditions, an incorrect integral value will be calculated. Since the integral calculation is a comparatively slow operation, the incorrect value will remain for a short time after the transient operation, whereby control performance will be impaired. To avoid this difficulty, update of the integral calculation is temporarily stopped during transient operation, and the integral value is held. Accordingly, mistaken integral calculation can be avoided.

Further, since delay in the control object has an impact for a short time after transient operation has finished, update is prohibited for a predetermined period after transient operation as well. In particular, since delay of the catalyst is large, the predetermined period after transient operation is favourably set as a period until the integrated air quantity after transient operation reaches a predetermined value. This is because the speed of recovery of the state of the catalyst from the impact of the transient operation is proportional to the intake air quantity due to the $O_2$ storage action of the catalyst.

Examples of transient operation include rapid acceleration or deceleration, fuel cut, rich control, lean control, stopping of the second air-fuel ratio feedback control unit, stopping of the first air-fuel ratio feedback control unit, forced variation of the air-fuel ratio for fault diagnosis, forced driving of the actuator for fault diagnosis, sudden changes in introduction of evaporative gas. Sudden acceleration or deceleration can be determined based on whether, for example, a change amount of the throttle opening degree per unit time is equal to or greater than a predetermined changed amount, or whether a change amount of the intake air quantity per unit time is equal to or greater than a predetermined change amount. Further, sudden change in the introduction of evaporation gas can be determined based on a change amount per unit time in the opening degree of the valve that introduces evaporation gas. Further, in addition to the above update condition, a configuration may be adopted in which the update condition is satisfied each time the control routine is performed a predetermined number of times. In this case, the speed of the integral calculation can be adjusted by the set number of performances, whereby the same effect as adjusting the integral gain can be achieved.

In step 1105, if the integral value update condition is satisfied, the routine proceeds to step 1106, where the integral value is updated.

$$AFI = AFI + Ki2(\Delta V_2)$$

Figure 12:
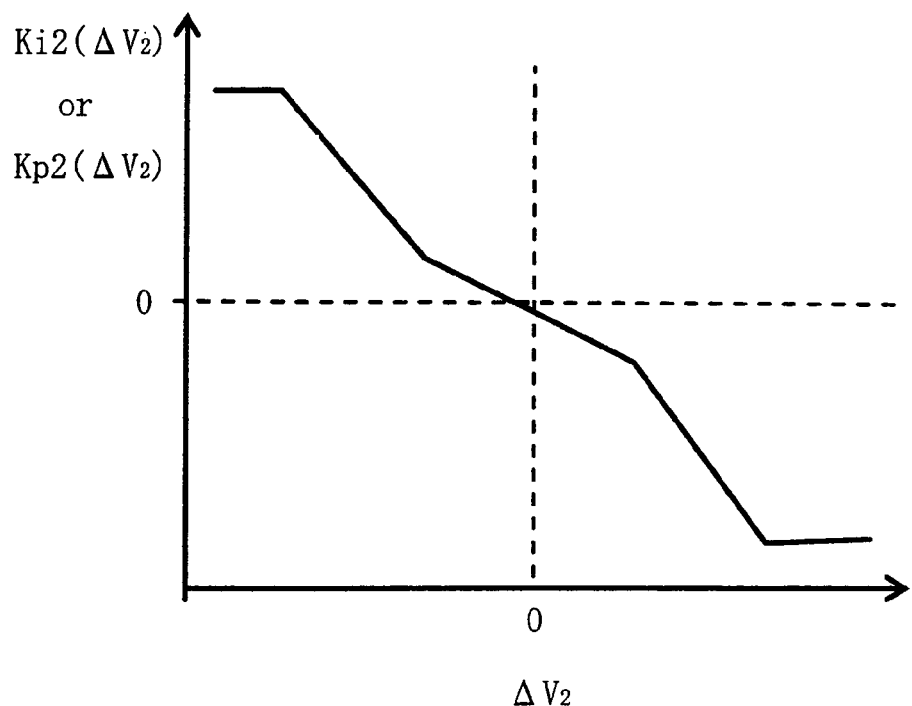
FIG. 12 is a characteristic chart that provides a supplementary explanation of FIG. 11.

AFI is the integral calculation value, which is stored in the backup RAM for each running condition; and $Ki2(\Delta V_2)$ is an update amount. A predetermined gain maybe used to simply set $Ki2(\Delta V) = Ki2 \times \Delta V_2$. Further, a single dimensional map like that shown in FIG. 12 may be used to perform variable gain setting in which an update amount is set in accordance with $\Delta V_2$. Moreover, variation of the upstream $O_2$ sensor characteristics corrected by the integral calculation value changes depending on running conditions like exhaust gas temperature, exhaust gas pressure etc. Thus, the backup RAM set for each running condition is provided in advance for the integral calculation value AFI, and the backup RAM which is updated for each change in running condition, namely, the integral value AFI, is switched. Further, storing of the integral calculated value AFI in the backup RAM makes it possible to inhibit deterioration in control performance caused by resetting of the integral calculated value each time the engine stops and re-starts.

Figure 13:
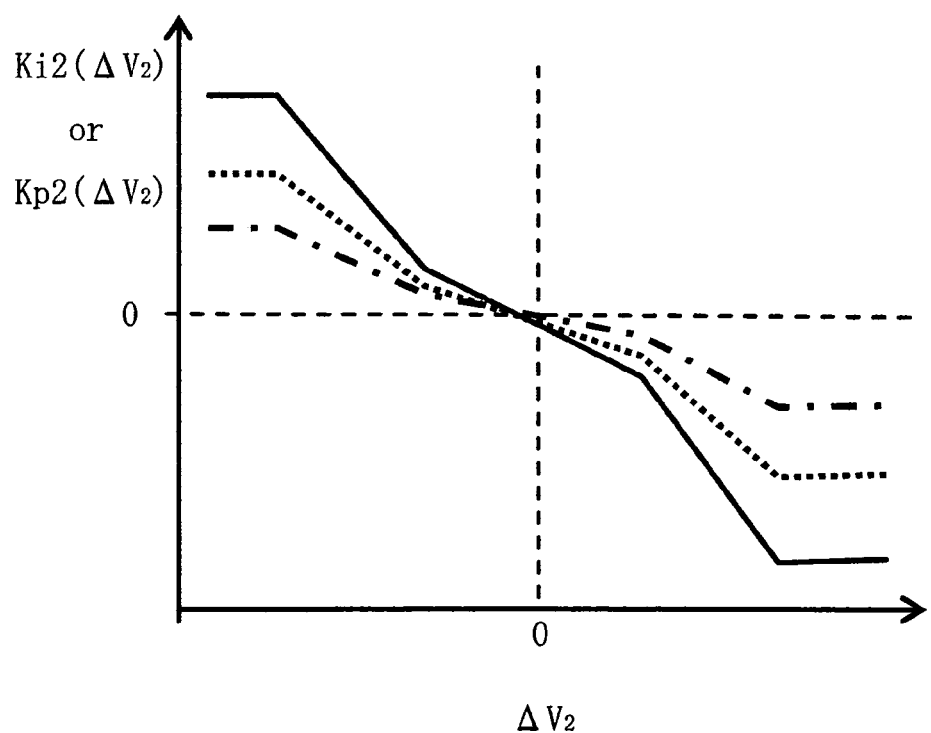
FIG. 13 is a characteristic chart that provides a supplementary explanation of FIG. 11.

Moreover, setting of the integral gain Ki2 may also be changed in accordance with the running conditions. As a result of adopting this configuration, it is possible to perform setting in accordance with change in the response delay of the control object that changes depending on running conditions, or to perform setting that takes into consideration different features of each driving condition (driveability etc.). In particular, variation of response delay from the upstream air-fuel ratio to the downstream air-fuel ratio due to the $O_2$ storage action of the catalyst and exhaust gas transfer delay is proportionate with the intake air quantity. Accordingly, the absolute value of the integral gain may be set proportionately to the intake air quantity. In FIG. 13, the solid line indicates setting when the intake air quantity is high, the dotted line indicates setting when the intake air quantity is moderate, and the dot-dash line indicates setting when the intake air quantity is low. Further, instead of increasing/decreasing the absolute value of the integral gain, the update cycle may be increased/decreased to achieve the same effect. Increase/decrease of the update cycle maybe achieved by using a configuration in which the integral value is updated each time the control routine is performed a predetermined number of times, and then increasing/decreasing the set predetermined number of times. On the other hand, if the integral update condition is not satisfied, the routine proceeds to step 1107 without the integral value being updated.

$$AFI = AFI$$

The routine proceeds to step 1108, where upper-lower limit processing of the integral value AFI is performed.

$$AFImin < AFI < AFImax$$

Since the range of characteristic variation of the upstream $O_2$ sensor 13 can be identified in advance, appropriate limit values that allow correction of the variation range are set. Performance of this processing makes it possible to prevent excessive manipulation of the air-fuel ratio, and prevent deterioration in driveability etc. Upper-lower limit values may be set for each running condition. Further, the setting may correspond with the range of characteristic variation of the upstream $O_2$ sensor 13 that changes depending on the running conditions, or limit values that are required from the point of view of driveability and that change depending on running conditions.

In step 1109, proportional calculation processing is performed.

$$AFP = Kp2(\Delta V_2)$$

where, AFP is the proportional calculation value. $Ki2(\Delta V_2)$ may be simply set using a predetermined gain to $Kp2(\Delta V) = Kp2 \times \Delta V_2$. Further, a single dimensional map like that shown in FIG. 12 may be used to perform variable gain setting in which an update amount is set in accordance with $\Delta V_2$.

Moreover, as with the integral gain, setting of the proportional gain Kp2 may also be changed in accordance with the running conditions. As a result of adopting this configuration, it is possible to perform setting in accordance with variation in response delay of the control object that changes depending on running conditions, or to perform setting that takes into consideration different features of each driving condition (driveability etc.). For example, the proportional gain Kp2 may be set as shown in FIG. 13, in which the solid line indicates setting when the intake air quantity is high, the dotted line indicates setting when the intake air quantity is moderate, and the dot-dash line indicates setting when the intake air quantity is low.

Moreover, when there is a transient running condition and the previously described updating of the integral value is not performed, the absolute value of the proportional gain Kp2 may be set larger for a predetermined period after the transient operation. As a result, it is possible to increase the recovery speed of the purification state of the catalyst, which has deteriorated due to disturbing influences. If the absolute value of the proportional gain Kp2 is set smaller for the predetermined period after the transient operation, it is possible to inhibit the manipulation amount of the target air-fuel ratio becoming excessive and causing deterioration in driveability. The predetermined period after transient operation may be set as the period until the integrated air quantity after transient operation reaches a predetermined value, in the same manner as for the integral calculation. This is because the speed of recovery of the state of the catalyst from the impact of the transient operation is proportional to the intake air quantity due to the $O_2$ storage action of the catalyst. If the absolute value of the proportional gain Kp2 is set larger for the predetermined period after the transient operation, recovery of the catalyst from the deteriorated purification state caused by the transient operation can be sped up, and deterioration of driveability during normal running can be inhibited.

Next, the routine proceeds to step 1110, where upper-lower limit processing of the proportional value AFP is performed.

$$AFPmin < AFP < AFPmax$$

Performance of this processing makes it possible to prevent excessive manipulation of the air-fuel ratio, and prevent deterioration in driveability etc. Further, upper-lower limit values may be set for each running condition, or the setting can correspond with limit values that are required from the point of view of driveability and that change depending on running conditions.

Next, the routine proceeds to step 1111, where PI calculation values are summed, and the target average air-fuel ratio is calculated.

$$AFAVEobj = AFAVE0 + AFP + AFI$$

AFAVE0 is the initial value set for each running condition, described previously, and is, for example, 14.53. AFI is the integral calculation value that is calculated in steps 1105 to 1108, and AFP is the proportional calculation value calculated in steps 1109, 1110.

The routine proceeds to step 1112, where upper-lower limit processing of the target average air-fuel ratio AFAVEobj is performed.

$$AFAVEobjmin < AFAVEobj < AFAVEobjmax$$

Performance of this processing makes it possible to prevent excessive manipulation of the air-fuel ratio, and prevent deterioration in driveability etc. Further, upper-lower limit values may be set for each running condition, or the setting can correspond with limit values that are required from the point of view of driveability and that change depending on running conditions.

Next, the routine proceeds to step 1113 where it is determined whether a condition for forcibly varying the target average air-fuel ratio AFAVEobj is satisfied. The forcible variation condition includes times of fault diagnosis, or times when the purification performance of the catalyst is being improved. Fault diagnosis includes diagnosis of the catalyst or the downstream $O_2$ sensor 15. Diagnosis can be performed by monitoring the wave form of the downstream $O_2$ sensor output when the target average air-fuel ratio AFAVEobj is being forcibly varied. Improving the purification performance of the catalyst can be achieved by adjusting the amplitude or cycle of variation of the air-fuel ratio at the upstream side of the catalyst. Determination of predetermined running conditions like the engine rotation number, the load, the coolant temperature, the acceleration-deceleration speed, or a timer may be used to establish the forcible variation condition.

If the forcible variation condition is satisfied, the routine proceeds to step 1114 where a forcible variation amount $\Delta A/F$ is added to the target average air-fuel ratio AFAVEobj.

$$AFAVEobj = AFAVEobj + \Delta A/F$$

where, $\Delta A/F$ is the amplitude of variation. $\Delta A/F$ is set to a predetermined absolute value that is either a positive value or a negative value, and that switches between the negative value and the positive value with a predetermined cycle. For example, $\Delta A/F$ may switch between +0.25 and −0.25 with the predetermined cycle.

Figure 14:
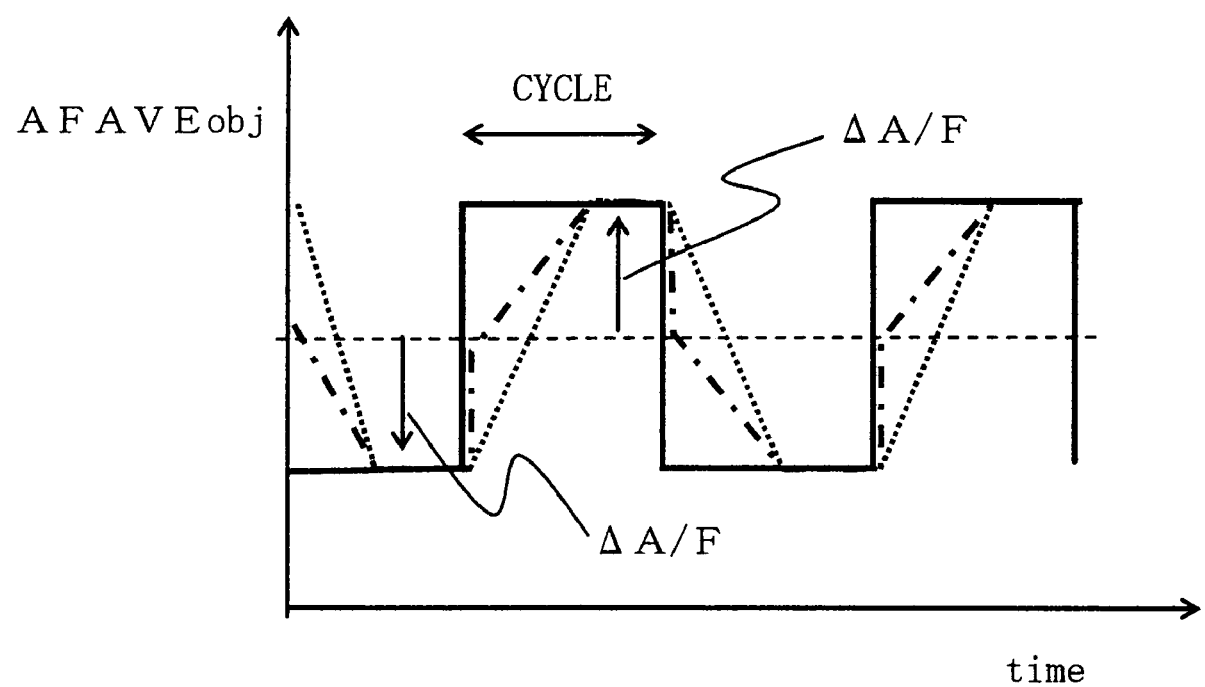
FIG. 14 is a characteristic chart that provides a supplementary explanation of FIG. 11.

As shown by the solid line in FIG. 14, the target average air-fuel ratio AFAVEobj may be changed in a step-like manner. Alternatively, the target average air-fuel ratio AFAVEobj may be given a chosen wave form with a predetermined amplitude and cycle, as shown by the dot or dot-dash lines. The amplitude of variation and the cycle maybe set for each running condition, thus allowing purification performance of the catalyst to be satisfied depending on requirements that vary in accordance with running conditions, like response delay of the control object or limitations required the point of view of driveability. In particular, when fault diagnosis of the catalyst is being performed, response delay caused by the $O_2$ storage action of the catalyst becomes very important. This response delay is inversely proportional to the intake air quantity, and thus the amplitude of variation or the variation cycle may be set to be inversely proportional with respect to the intake air quantity. Note that, if the forcible variation condition is not satisfied, the calculation routine is immediately terminated.

Figure 15:
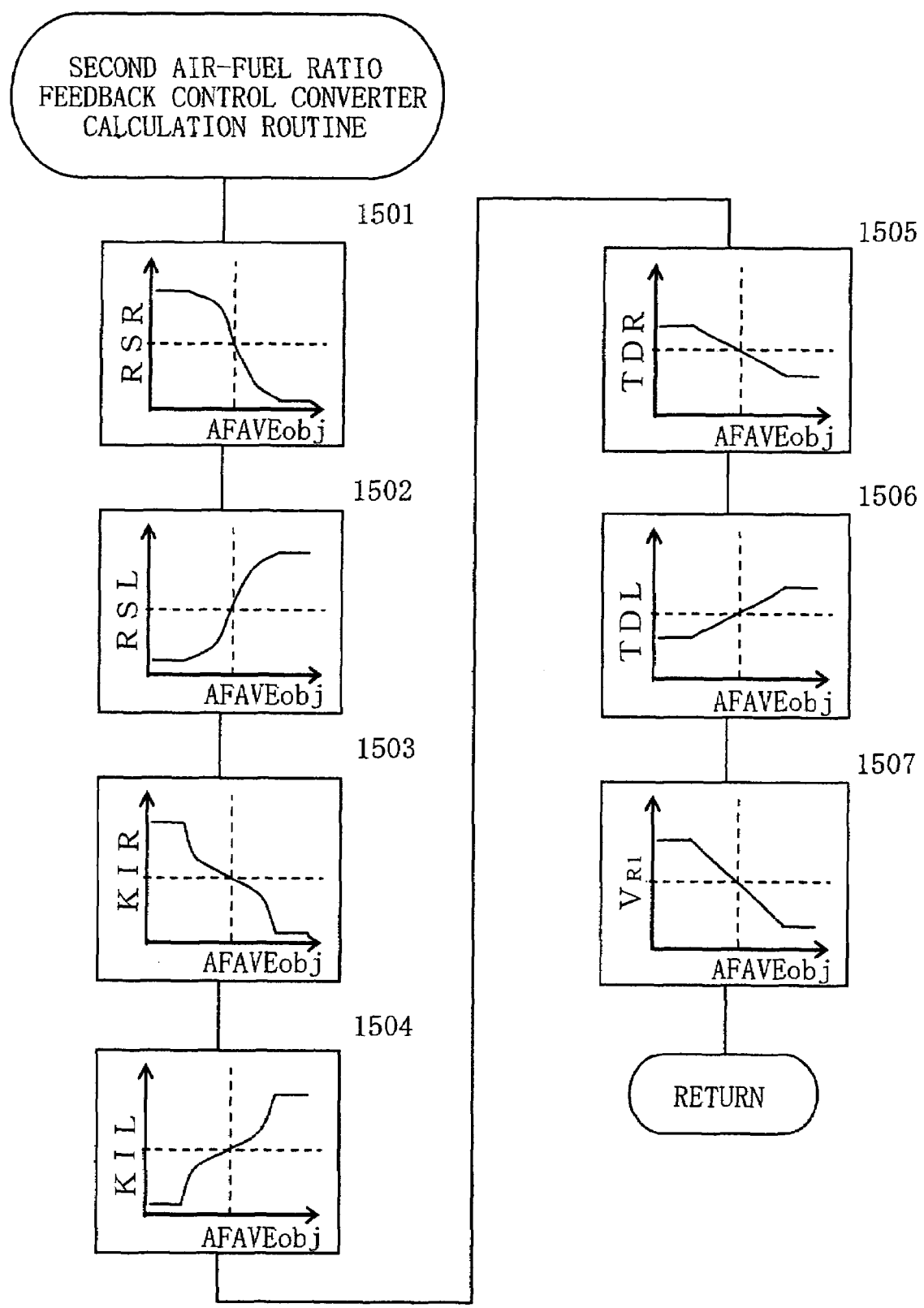
FIG. 15 is a flow chart that explains calculation of a converter of the second air-fuel ratio feedback control unit.

FIG. 15 is a calculation routine of the converter that sets the comparison voltage $V_{R1}$, and the skip amounts RSR, RSL, the integration constants KIR, KIL, and the time delays TDR, TDL that are first control constants of the first air-fuel ratio feedback control unit 0103 in accordance with the target average air-fuel ratio of the upstream side in the second air-fuel ratio feedback control unit 0102. The routine is performed at predetermined time intervals, for example, every 5 ms.

In step 1501, the skip amount RSR is calculated in accordance with the target average air-fuel ratio AFAVEobj. Calculation is performed using a single dimensional map in which set values are pre-established based on a bench test or experiment which will be described later. Set values or map retrieval results are output in response to and correspondence with the input. The single dimensional map is set for each running condition. The single dimensional map is switched in accordance with change in the running conditions, and then map retrieval is performed. The running conditions include conditions related to the responsiveness and characteristics etc. of the configuration of the first air-fuel ratio feedback control unit 0103, for example, the rotation number, the load, idling, the coolant temperature, the exhaust gas temperature, the temperature of the upstream $O_2$ sensor 13, and EGR opening degree. For example, the running conditions can be set with running zones divided according to predetermined rotation numbers, loads and coolant temperatures. Alternatively, it is not essential to use a single dimensional map. Instead, a unit that indicates the relationship between inputs and outputs, for example, an approximation expression, may be used, or a higher order map or a higher order expression that can handle a greater number of inputs may be utilized.

In step 1502, the skip amount RSL that accords with the target average air-fuel ratio AFAVEobj is calculated using the same method as employed in step 1501. Then, in step 1503 the integration constant KIR that accords with the target average air-fuel ratio AFAVEobj is calculated using the same method as in step 1501. In step 1504 the integration constant KIL that accords with the target average air-fuel ratio AFAVEobj is calculated using the same method as in step 1501. In step 1505 the time delay TDR that accords with the target average air-fuel ratio AFAVEobj is calculated using the same method as in step 1501. In step 1506 the time delay TDL that accords with the target average air-fuel ratio AFAVEobj is calculated using the same method as in step 1501. In step 1507 the comparison voltage $V_{R1}$ that accords with the target average air-fuel ratio AFAVEobj is calculated using the same method as in step 1501, and then the control routine is terminated.

In this manner, the skip amounts RSR, RSL, the integration constants KIR, KIL, and the time delays TDR, TDL and the comparison voltage $V_{R1}$ that are first control constants are respectively calculated in accordance with the target average air-fuel ratio AFAVEobj. The respective set values are pre-established based on bench test calculations or experimental values such that the average air-fuel ratio at the upstream side of the actual catalyst becomes the target average air-fuel ratio AFAVEobj that is the input. Further, by changing the set values of the first control constant depending on the running conditions, setting can be achieved that aligns the target average air-fuel ratio and the actual average air-fuel ratio regardless of the running conditions.

Figure 16:
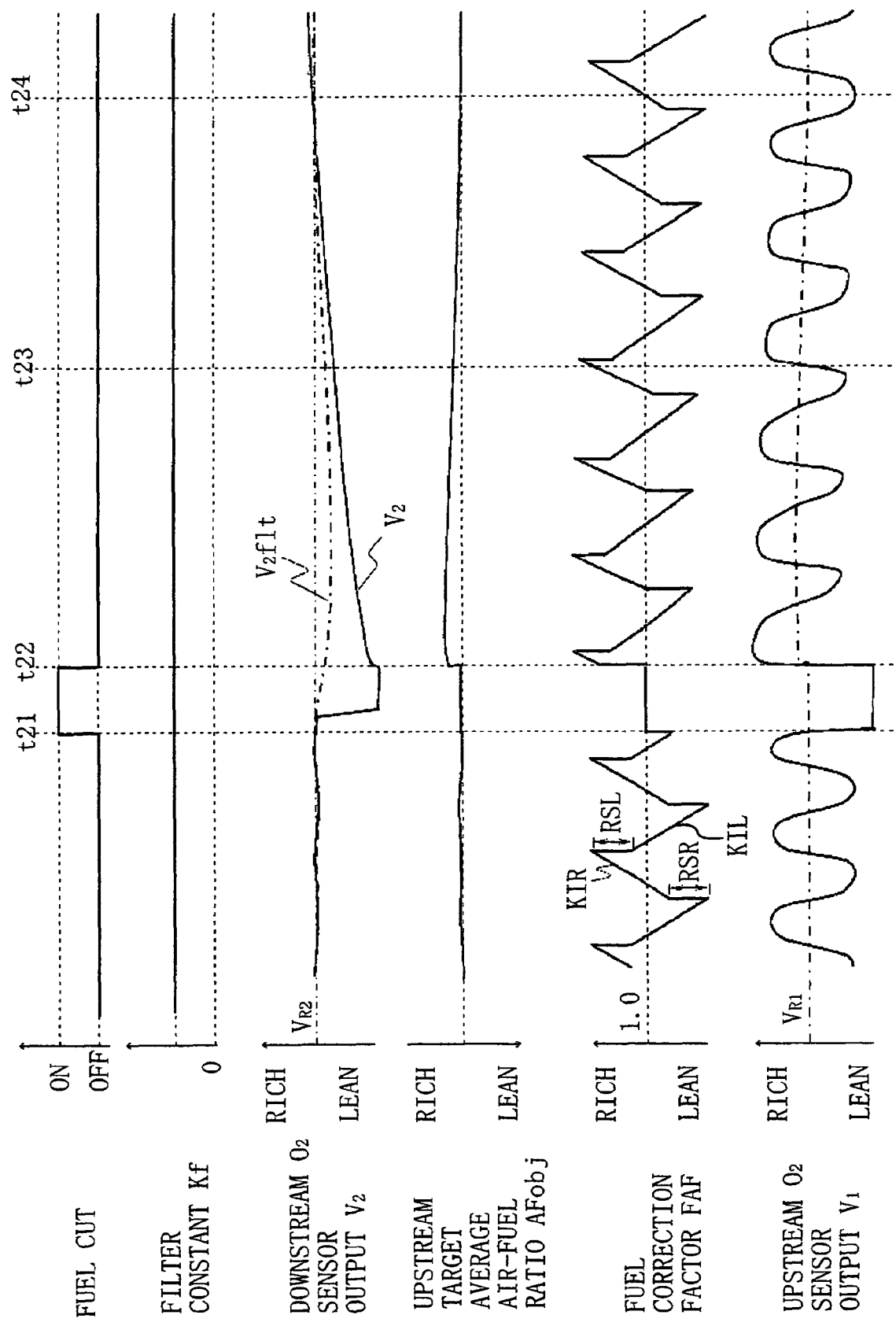
FIG. 16 is a timing chart for a known air-fuel ratio control when a non-deteriorated catalyst is being used.
Figure 17:
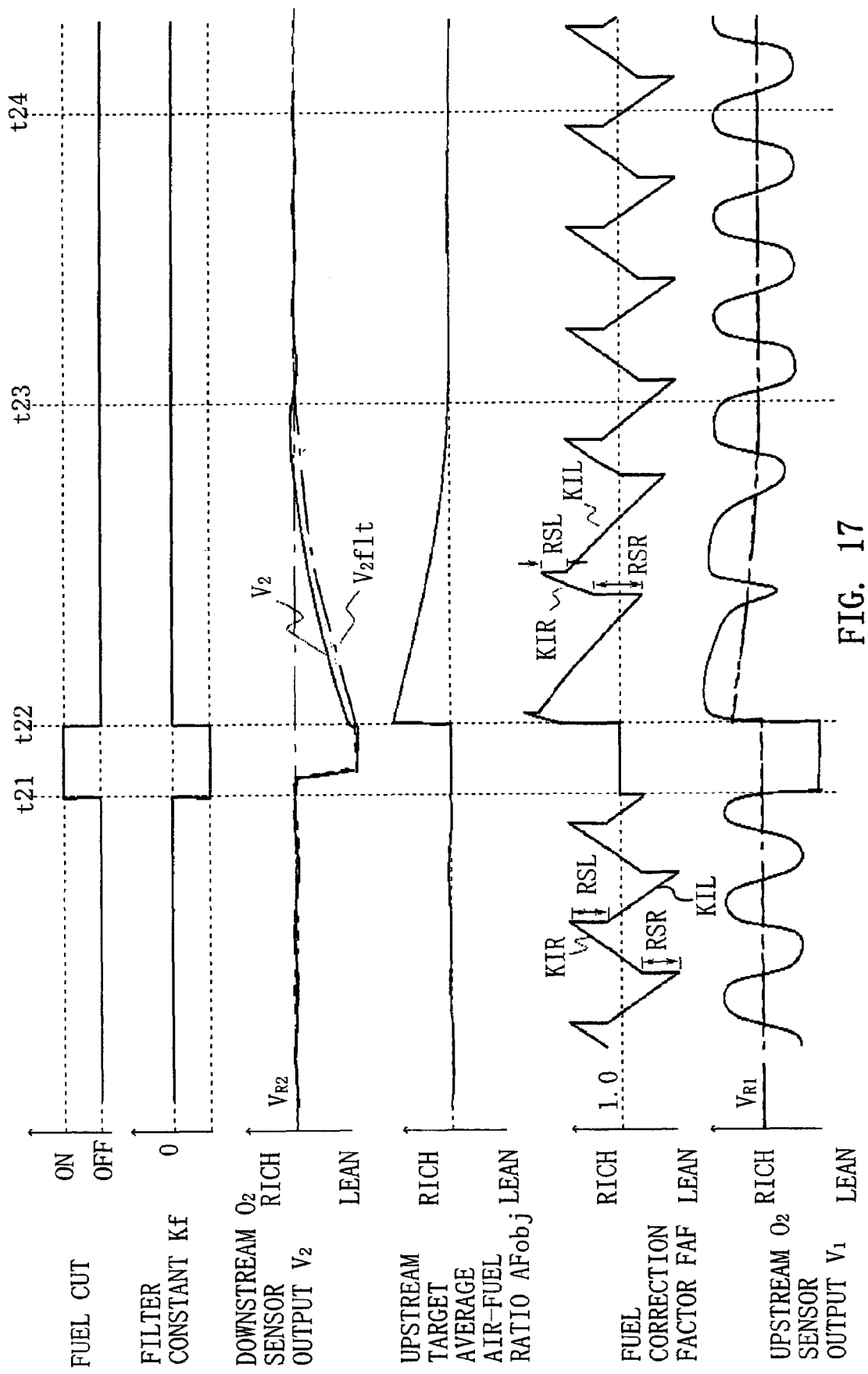
FIG. 17 is a timing chart for an air-fuel ratio control of the first embodiment when a non-deteriorated catalyst is being used.
Figure 18:
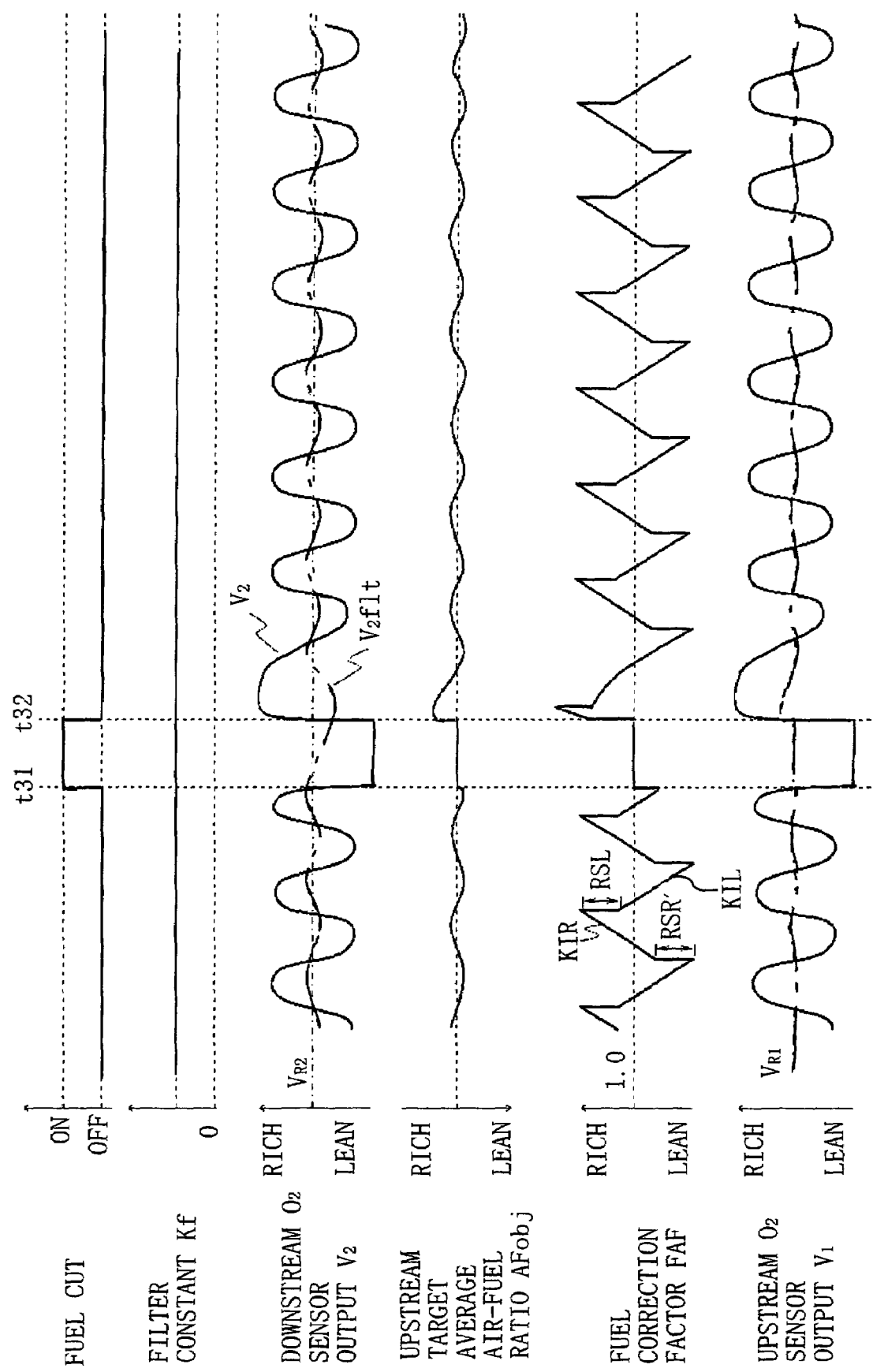
FIG. 18 is a timing chart for the known air-fuel ratio control when a deteriorated catalyst is being used.
Figure 19:
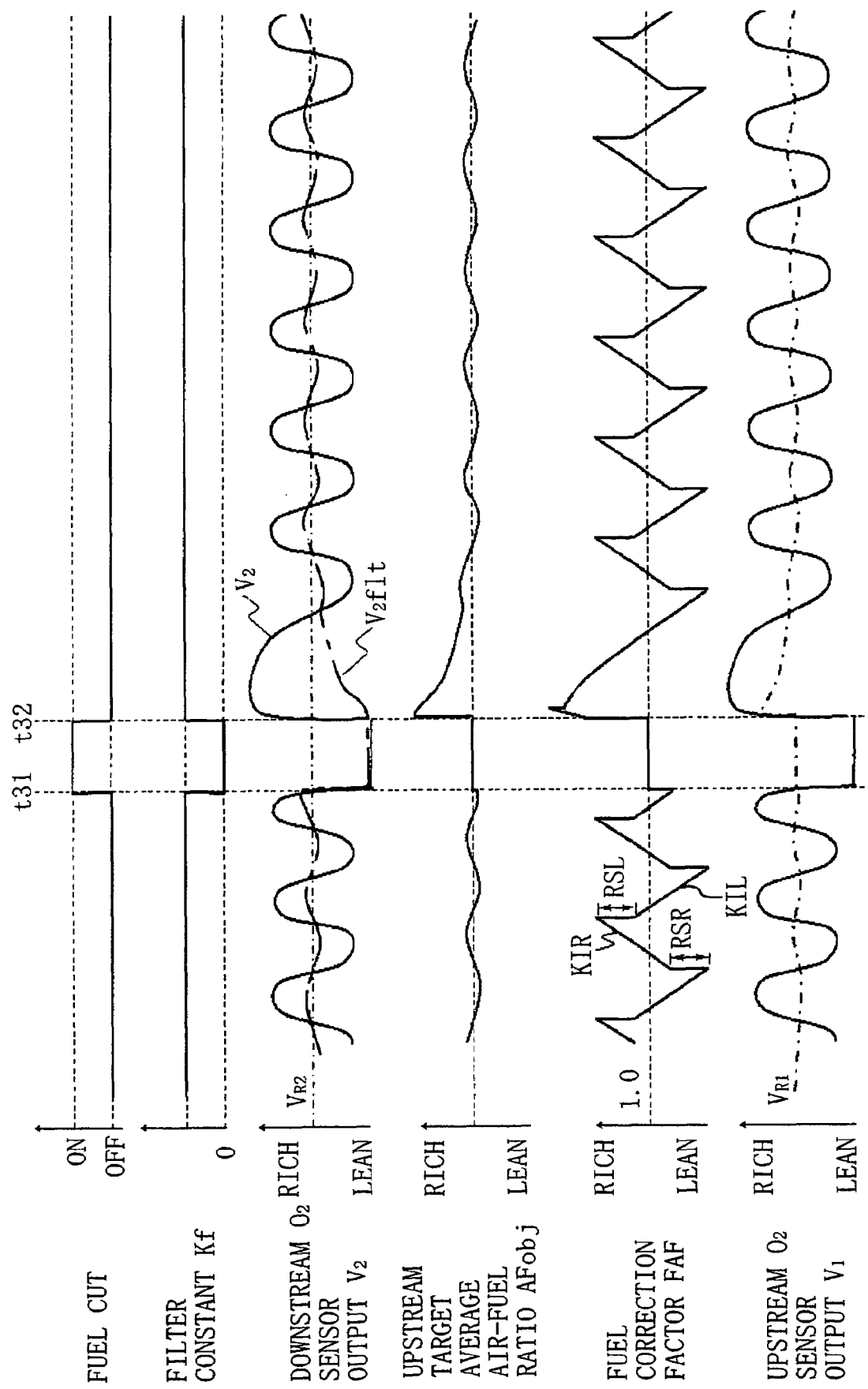
FIG. 19 is a timing chart for the air-fuel ratio control of the first embodiment when a deteriorated catalyst is being used.

Next, FIGS. 16 to 19 will be used to explain the behavior of the air-fuel ratio control of the first embodiment in comparison to known air-fuel ratio control. FIGS. 16 and 17 show examples when non-deteriorated catalysts are being used, and FIGS. 18 and 19 shows examples when deteriorated catalysts are being used.

FIG. 16 is a timing chart for the known air-fuel ratio control when a non-deteriorated catalyst is being used. Between times t21 and t22, a fuel cut control is performed, and the air-fuel ratio is controlled such that it becomes distinctly lean. Accordingly, oxygen is stored in the catalyst. When the upper limit of the storage capacity of the catalyst is reached, the atmosphere of the catalyst can no longer be maintained in the vicinity of the stoichiometric air-fuel ratio. Thus, the downstream $O_2$ sensor output $V_2$ deviates substantially away from the target value $V_{R2}$ to the lean side.

Since the downstream $O_2$ sensor output $V_2$ is filter processed, the post-filter processing downstream $O_2$ sensor output $V_2$flt, as shown by the dot-dash line, is significantly delayed as compared to the sudden change in the downstream $O_2$ sensor $V_2$. The upstream target average air-fuel ratio AFobj is calculated by the second air-fuel ratio feedback control in accordance with the post-filter processing downstream $O_2$ sensor output $V_2$flt. Accordingly, the upstream target average air-fuel ratio does not switch to the rich side immediately after the fuel cut. As a result, there is a delay in the recovery period of the catalyst state, from a lean state with reduced purification capability caused by the fuel cut, to a state with high purification capability in the vicinity of the stoichiometric air-fuel ratio (time t24).

On the other hand, FIG. 17 is a timing chart for the air-fuel ratio control of the first embodiment when a non-deteriorated catalyst is being used. After the fuel cut takes place, the filter constant Kf is set smaller (the time constant is set smaller), and thus the catalyst state that has become lean due to the fuel cut can be detected without delay following the end of the fuel cut (time t22) using the post-filter processing output $V_2$flt of the downstream $O_2$ sensor output $V_2$. The downstream $O_2$ sensor output $V_2$ is filter processed but the post-filter processing downstream $O_2$ sensor output $V_2$flt follows the sudden change in the downstream $O_2$ sensor output $V_2$ without delay as shown by the dot-dash line. Since the upstream target average air-fuel ratio AFobj is calculated by the second air-fuel ratio feedback control in accordance with the post-filter processing downstream $O_2$ sensor output $V_2$flt, the upstream average air-fuel ratio can be controlled to the rich side without delay after the fuel cut. Accordingly, the recovery period of the catalyst state from lean to the stoichiometric air-fuel ratio is sped up as compared to the example of the known technology, and occurs by time 23 instead of time 24.

FIG. 18 is a timing chart for the air-fuel ratio control of the know air-fuel ratio control when a deteriorated catalyst is being used. The catalyst oxygen storage capability has deteriorated to substantially zero, and the upstream air-fuel ratio is passed to the downstream side without any change. Thus, the outputs of the upstream $O_2$ sensor output $V_1$ and the downstream $O_2$ sensor output $V_2$ are substantially the same. The downstream 92 sensor output $V_2$ is filter processed as shown by the dot-dash line. Thus, large variations in the upstream target average air-fuel ratio AFobj calculated using the post-filter processing value are suppressed (in other words, variations are made smaller), whereby the control system is inhibited from becoming unstable. After the fuel cut control from time t31 to time t32 is finished, the downstream $O_2$ sensor output recovers from the lean state without delay, and thus there is no return delay as with the non-deteriorated catalyst.

On the other hand, FIG. 19 is a timing chart for the air-fuel ratio control of the first embodiment when a deteriorated catalyst is being used. Fuel cut control is performed from time t31 to time t32, and the filter constant Kf is set smaller (the time constant is set smaller). After the fuel cut, the post-filtering downstream $O_2$ sensor output $V_2$flt becomes a lean value. Thus, after the fuel cut, the upstream average air-fuel ratio is controlled to the rich side, but the downstream $O_2$ sensor output recovers from the lean state without delay, and becomes over rich in a short period. However, since recovery occurs rapidly, there is not substantial deterioration in the catalyst purification state. Further, this level of deterioration is not problematic since the catalyst is deteriorated and the catalyst purification state is normally poor.

In this manner, the constant for the filter processing of the downstream $O_2$ sensor output can be set smaller during rich or lean control in order to allow the deteriorated purification state of the catalyst to be detected without delay. Further, recovery of the purification state can be achieved rapidly after rich or lean control is terminated. In addition, as with the known technology, the impact of variation in the downstream $O_2$ sensor output when the catalyst is deteriorated can be suppressed, and the stability of the dual $O_2$ control system can be maintained.

Second Embodiment

It is sufficient if the downstream $O_2$ sensor is a sensor that can detect the purification state of the upstream catalyst. Since a linear air-fuel ratio sensor, a NOx sensor, an HC sensor, a CO sensor or the like can also control the purification state of the catalyst, the same effects as above can be achieved if such sensors are used. The upstream $O_2$ sensor may be a linear $O_2$ sensor that has linear output characteristics with respect to changes in the air-fuel ratio. In this case, since the upstream air-fuel ratio can be controlled in a similar manner to a $\lambda$ $O_2$ sensor, the same effects as above can be achieved. The second air-fuel ratio feedback control unit described above is configured from a proportional calculation and an integral calculation. However, even if the configuration also includes a differential calculation, the feedback control can be performed and the same effects as above can be achieved.

The, second air-fuel ratio feedback control unit described above is configured such that the target air-fuel ratio is calculated using the proportional calculation and the integral calculation based on the second target value $V_{R2}$ and the downstream $O_2$ sensor output information. However, other feedback controls, for example, state feedback control based on modern control theory, sliding mode control, observer, adaptive control or H∞ control, may also be used to calculate the target air-fuel ratio from the second target value $V_{R2}$ and the downstream $O_2$ sensor output $V_2$. If such a configuration is adopted, the purification state of the catalyst can be controlled and thus the same effects as above can be achieved.

The filter processing of the downstream $O_2$ sensor output described above uses a first order lag process. However, other types of processing having a filter effect, for example, a higher order filter like a band pass filter or a low pass filter may be used. By changing the constants that increase and decrease the filter effect of such filters, the same effects as above can be achieved. Further, it is sufficient if smoothing processing is used for the delay. For example, if a dead time process is used, the dead time may be increased or decreased, or alternatively, if a moving average process is used, the sample number of the averaging process may be increased or decreased. By adopting such configurations, the same effects as above can be achieved.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An air-fuel ratio control device for an internal combustion engine, comprising:
   a catalyst, disposed in an exhaust system of the internal combustion engine, that purifies exhaust gas;
   an upstream and a downstream air-fuel ratio sensor respectively disposed at an upstream side and a downstream side of the catalyst, the upstream and the downstream air-fuel ratio sensors detecting the air-fuel ratio of the exhaust gas;
   a first air-fuel ratio feedback control unit that adjust the air-fuel ratio supplied to the internal combustion engine using an output value of the upstream air-fuel ratio sensor;
   a filter processing unit that performs filter processing such that variation in an output value of the downstream air-fuel ratio sensor is suppressed;
   a second air-fuel ratio feedback control unit that adjusts a control constant of the first air-fuel ratio feedback control unit using the filter processed value of the output value of the downstream air-fuel ratio sensor; and
   a filter constant change unit that changes a filter constant of the filter processing unit so as to reduce suppression of the filter processing and set a filter effect smaller, when the air-fuel ratio supplied to the internal combustion engine is being controlled to be rich or lean using rich or lean control, and not when the air-fuel ratio is being controlled such that the atmosphere of the catalyst is in the vicinity of the stoichiometric air-fuel ratio.

2. An air-fuel ratio control device for an internal combustion engine, comprising:
   a catalyst, disposed in an exhaust system of the internal combustion engine, that purifies exhaust gas;
   an upstream and a downstream air-fuel ratio sensor respectively disposed at an upstream side and a downstream side of the catalyst, the upstream and the downstream air-fuel ratio sensors detecting the air-fuel ratio of the exhaust gas;
   a first air-fuel ratio feedback control unit that adjust the air-fuel ratio supplied to the internal combustion engine using an output value of the upstream air-fuel ratio sensor;
   a filter processing unit that performs filter processing such that variation in an output value of the downstream air-fuel ratio sensor is suppressed;
   a second air-fuel ratio feedback control unit that adjusts a control constant of the first air-fuel ratio feedback control unit using the filter processed value of the output value of the downstream air-fuel ratio sensor; and
   a filter constant change unit that changes a filter constant of the filter processing unit so as to reduce suppression of the filter processing and set a filter effect smaller, when the air-fuel ratio supplied to the internal combustion engine is being controlled to be rich or lean using rich or lean control, and not when the air-fuel ratio is being controlled such that the atmosphere of the catalyst is in the vicinity of the stoichiometric air-fuel ratio,
   wherein a period for which the filter effect is set smaller is set as: a period for which the air-fuel ratio supplied to the internal combustion engine is being controlled to be rich or lean using the rich or the lean control, rather than being controlled such that the atmosphere of the catalyst is in the vicinity of the stoichiometric air-fuel ratio; or is set as a post-completion predetermined period following completion of the rich or the lean control.

3. The air-fuel ratio control device for the internal combustion engine according to claim 2, wherein
the post-completion predetermined period is set as a period until a predetermined time elapses following completion of the rich or the lean control.

4. The air-fuel ratio control device for the internal combustion engine according to claim 2, wherein
the post-completion predetermined period is set as a period until the output value of the downstream air-fuel ratio sensor reaches a predetermined value after completion of the rich or the lean control.

5. The air-fuel ratio control device for the internal combustion engine according to claim 2, wherein
the post-completion predetermined period is set as a period until a predetermined time elapses after the output value of the downstream air-fuel ratio sensor reaches a predetermined value after completion of the rich or the lean control.

6. The air-fuel ratio control device for the internal combustion engine according to claim 2, wherein
the post-completion predetermined period is set as a period until an integrated intake air quantity after completion of the rich or the lean control reaches a predetermined value.

7. The air-fuel ratio control device for the internal combustion engine according to claim 1, wherein a period for which the filter effect is set smaller is set as any one of: a period for which the first air-fuel ratio feedback control unit is stopped; and a period for which the second air-fuel ratio feedback control unit is stopped.

8. An air-fuel ratio control device for an internal combustion engine, comprising:
a catalyst, disposed in an exhaust system of the internal combustion engine, that purifies exhaust gas;
an upstream and a downstream air-fuel ratio sensor respectively disposed at an upstream side and a downstream side of the catalyst, the upstream and the downstream air-fuel ratio sensors detecting the air-fuel ratio of the exhaust gas;
a first air-fuel ratio feedback control unit that adjust the air-fuel ratio supplied to the internal combustion engine using an output value of the upstream air-fuel ratio sensor;
a filter processing unit that performs filter processing such that variation in an output value of the downstream air-fuel ratio sensor is suppressed;
a second air-fuel ratio feedback control unit that adjusts a control constant of the first air-fuel ratio feedback control unit using the filter processed value of the output value of the downstream air-fuel ratio sensor; and
a filter constant change unit that changes a filter constant of the filter processing unit so as to reduce suppression of the filter processing and set a filter effect smaller, when the air-fuel ratio supplied to the internal combustion engine is being controlled to be rich or lean using rich or lean control, and not when the air-fuel ratio is being controlled such that the atmosphere of the catalyst is in the vicinity of the stoichiometric air-fuel ratio,
wherein a period for which the filter effect is set smaller is set as any one of: a period for which the first air-fuel ratio feedback control unit is stopped and a predetermined period after re-starting of the stopped first air-fuel ratio feedback control unit; a period for which the second air-fuel ratio feedback control unit is stopped and a predetermined period after re-starting of the stopped second air-fuel ratio feedback control unit.

9. The air-fuel ratio control device for the internal combustion engine according to claim 8, wherein
the post-completion predetermined period is set as a period until a predetermined time elapses following completion of the rich or the lean control.

10. The air-fuel ratio control device for the internal combustion engine according to claim 8, wherein
the post-completion predetermined period is set as a period until the output value of the downstream air-fuel ratio sensor reaches a predetermined value following completion of the rich or the lean control.

11. The air-fuel ratio control device for the internal combustion engine according to claim 8, wherein
the post-completion predetermined period is set as a period until a predetermined time elapses after the output value of the downstream air-fuel ratio sensor reaches a predetermined value after completion of the rich or the lean control.

12. The air-fuel ratio control device for the internal combustion engine according to claim 8, wherein
the post-completion predetermined period is set as a period until an integrated intake air quantity after completion of the rich or the lean control reaches a predetermined value.

13. The air-fuel ratio control device for the internal combustion engine according to claim 1, wherein
the filter effect to be set smaller is zero.

* * * * *